(12) United States Patent
Furuichi et al.

(10) Patent No.: US 10,516,970 B2
(45) Date of Patent: Dec. 24, 2019

(54) APPARATUS AND METHOD

(71) Applicant: SONY CORPORATION, Tokyo (JP)

(72) Inventors: Sho Furuichi, Tokyo (JP); Shinichiro Tsuda, Kanagawa (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/169,559

(22) Filed: Oct. 24, 2018

(65) Prior Publication Data

US 2019/0082299 A1 Mar. 14, 2019

Related U.S. Application Data

(63) Continuation of application No. 15/321,392, filed as application No. PCT/JP2015/002868 on Jun. 8, 2015, now Pat. No. 10,149,106.

(30) Foreign Application Priority Data

Jul. 8, 2014 (JP) .................................. 2014-140471

(51) Int. Cl.
*H04W 4/02* (2018.01)
*H04W 16/14* (2009.01)
(Continued)

(52) U.S. Cl.
CPC ........... *H04W 4/025* (2013.01); *H04W 4/021* (2013.01); *H04W 16/14* (2013.01);
(Continued)

(58) Field of Classification Search
CPC ............. H04W 16/14; H04W 72/0453; H04W 72/082; H04W 84/12; H04W 24/10;
(Continued)

(56) References Cited

U.S. PATENT DOCUMENTS

2009/0010166 A1 1/2009 Li et al.
2011/0080882 A1* 4/2011 Shu ....................... H04W 28/26
370/329
(Continued)

FOREIGN PATENT DOCUMENTS

CN 103002575 A 3/2013
EP 2 012 441 A1 1/2009
(Continued)

OTHER PUBLICATIONS

Japanese Office Action dated Oct. 10, 2017 in Patent Application No. 2014-1404 71 (with English Translation).
(Continued)

*Primary Examiner* — Kwasi Karikari
(74) *Attorney, Agent, or Firm* — Xsensus LLP

(57) ABSTRACT

A system that acquires at least position information, height information and first priority information corresponding to a first wireless communication system, and second priority information corresponding to a second wireless communication system; determines a use condition for a shared frequency band shared between the first and second wireless communication systems based on the position information, the height information, the first priority information and the second priority information; and outputs a notification based on the determined use condition.

15 Claims, 14 Drawing Sheets

(51) Int. Cl.
*H04W 4/021* (2018.01)
*H04W 72/04* (2009.01)
*H04W 72/10* (2009.01)
*H04W 64/00* (2009.01)

(52) U.S. Cl.
CPC ....... *H04W 72/0453* (2013.01); *H04W 72/10* (2013.01); *H04W 64/003* (2013.01)

(58) Field of Classification Search
CPC ... H04W 4/023; H04W 52/243; H04W 64/00; H04W 72/0446; H04W 24/02; H04W 72/085; H04W 88/02; H04W 28/08; H04W 24/04; H04W 48/18; H04W 56/001; H04W 52/244; H04W 28/0284; H04W 28/0289; H04W 36/08; H04W 36/22; H04W 48/10; H04W 56/002; H04W 72/02
See application file for complete search history.

(56) References Cited

U.S. PATENT DOCUMENTS

| | | |
|---|---|---|
| 2011/0250857 A1 | 10/2011 | Reial et al. |
| 2013/0057436 A1 | 3/2013 | Krasner et al. |
| 2013/0217406 A1 | 8/2013 | Villardi et al. |
| 2013/0316757 A1 | 11/2013 | Li et al. |
| 2014/0080535 A1 | 3/2014 | Gauvreau et al. |
| 2014/0135048 A1 | 5/2014 | Kasslin et al. |
| 2014/0248916 A1* | 9/2014 | Nakamuru ............ H04W 16/14 455/501 |
| 2015/0085899 A1 | 3/2015 | Raghupathy et al. |

FOREIGN PATENT DOCUMENTS

| | | |
|---|---|---|
| JP | 2010-166505 A | 7/2010 |
| JP | 2012-34326 A | 2/2012 |
| JP | 2012-104896 A | 5/2012 |
| JP | 2012-109922 A | 6/2012 |
| JP | 2013-531437 A | 8/2013 |
| JP | 2014-510500 A | 4/2014 |
| WO | 2013/061586 A1 | 5/2013 |

OTHER PUBLICATIONS

International Search Report dated Sep. 22, 2015 in PCT/JP2015/002868 filed Jun. 8, 2015.

"Notice of Proposed Rulemaking and Order", Federal Communications Commission, FCC 12-148, Dec. 2012, pp. 1-65.

* cited by examiner

APPARATUS AND METHOD

CROSS REFERENCE TO RELATED APPLICATIONS

This application is a Continuation of application Ser. No. 15/321,392 filed Dec. 22, 2016, which is a National Stage Entry of International Application PCT/JP2015/002868 filed Jun. 8, 2015, and claims the benefit of Japanese Priority Patent Application JP 2014-filed Jul. 8, 2014, the entire contents of which are incorporated herein by reference.

TECHNICAL FIELD

The present disclosure relates to an apparatus and a method.

BACKGROUND ART

In 2002, the mobile phone service of the 3G system called the third generation in Japan started. Initially, small-size packets were transmitted and received for transmission of voice calls and mails. However, with the introduction of high speed downlink packet access (HSDPA), it became possible to transmit and receive larger-size packets for downloading of music files or streaming of video. With such an increase of packet capacities, the service of long term evolution (LTE) in which orthogonal frequency division multiple access (OFDMA) is used for downlink also started for the expansion on the side of the wireless network. In addition, the start of the 4G service is planned for around 2015. Accordingly, up to 1 Gbps (bit per second) is realized in a semi-fixed state and also up to 100 Mbps is realized even in a moving environment.

Also, for example, utilization of small cells is studied to handle hot spots at which traffic locally concentrates or to improve the utilization efficiency of frequency resource. Also, for example, there is an ongoing study on introduction of a frequency sharing technology for sharing frequency band, called white space, which is unused temporally or locally, between systems in accordance with a rule. Also, as disclosed in NPL1, in North America, the FCC is studying a scheme of frequency sharing for sharing frequency band that is unused temporally or locally, between the systems in accordance with a rule.

CITATION LIST

Non Patent Literature

[NPL 1]
FCC, "GN Docket No. 12-354 NOTICE OF PROPOSED RULEMAKING AND ORDER", December 2012

SUMMARY

Technical Problem

For example, in the scheme of frequency sharing studied by the FCC, the use of the frequency band by the wireless communication device is authorized on the basis of the position (position on a two-dimensional flat surface) of a wireless communication device. Specifically, for example, the use of the frequency band is authorized in an area other than an exclusion zone.

However, only the two-dimensional flat surface is considered, when the use of the frequency band is authorized on the basis of the position (position on the two-dimensional flat surface) of the wireless communication device. Hence, even when the interference is small in a three-dimensional space for a wireless communication device that uses a frequency band, it is possible that the use of the frequency band by the wireless communication device is not authorized. That is, the utilization efficiency of the frequency band can be low.

Thus, for example, it is desirable to provide a scheme that enhances the utilization efficiency of the frequency band which is sharable between a plurality of wireless communication systems.

Solution to Problem

According to a first exemplary embodiment, the disclosure is directed to a system that acquires at least position information, height information and first priority information corresponding to a first wireless communication system, and second priority information corresponding to a second wireless communication system; determines a use condition for a shared frequency band shared between the first and second wireless communication systems based on the position information, the height information, the first priority information and the second priority information; and outputs a notification based on the determined use condition.

According to another exemplary embodiment, the disclosure is directed to a method including acquiring at least position information, height information and first priority information corresponding to a first wireless communication system, and second priority information corresponding to a second wireless communication system; determining a use condition for a shared frequency band shared between the first and second wireless communication systems based on the position information, the height information, the first priority information and the second priority information; and outputting a notification based on the determined use condition.

According to another exemplary embodiment, the disclosure is directed to a non-transitory computer-readable medium including computer program instructions, which when executed by an information processing system, cause the system to: acquire at least position information, height information and first priority information corresponding to a first wireless communication system, and second priority information corresponding to a second wireless communication system; determine a use condition for a shared frequency band shared between the first and second wireless communication systems based on the position information, the height information, the first priority information and the second priority information; and output a notification based on the determined use condition.

DESCRIPTION OF EMBODIMENTS

Figure 1:
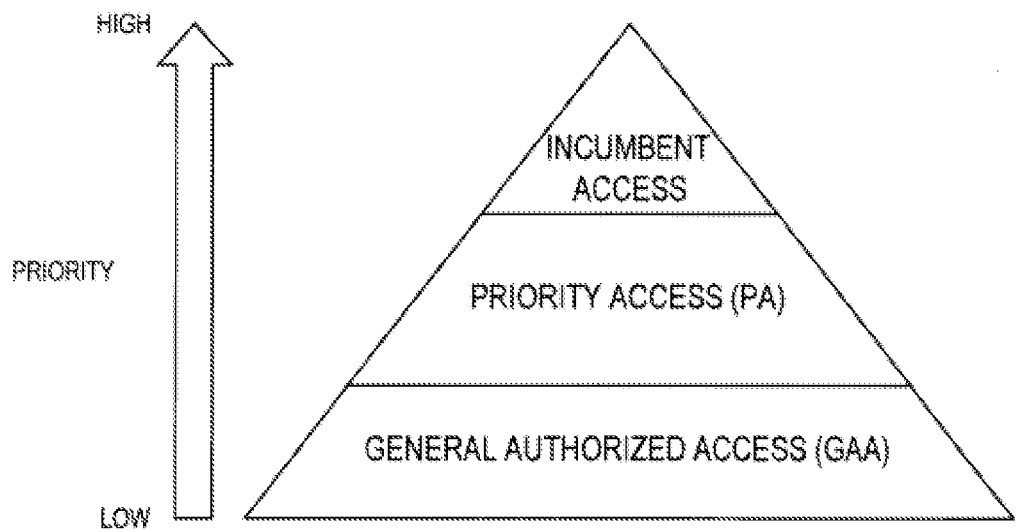
FIG. 1 is an explanatory diagram for describing "tier" in a scheme of frequency sharing studied by the FCC.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Introduction
2. Schematic Configuration of System
3. Configuration of Information Processing Apparatus
4. Flow of Process
5. Application Examples
6. Conclusion 1. Introduction First, with reference to FIGS. 1 to 5, "tier" and authorization of use of a frequency band in the scheme of frequency sharing studied by the FCC will be described.
("Tier" in Scheme of Frequency Sharing Studied by FCC)

The Non Patent Literature, the FCC, "GN Docket No. 12-354 NOTICE OF PROPOSED RULEMAKING AND ORDER", December 2012 proposes creation of a new public broad band service in 3.5 GHz band of North America. 3.5 GHz band is currently used for the purpose of non-federal fixed-satellite services and radars of United States Department of Defense (i.e., "Incumbent Use"). Thus, a dynamic sharing model utilizing a database, such as SAS, is introduced, and formulation of a framework for using the frequency band for "Incumbent Use" in new public broad band services is started as well.

In "three-tiered licensing proposal" of the Non Patent Literature, each user of the frequency band is classified into any one of three groups. This group is called "tier". In the following, this point will be described with reference to FIG. 1.

FIG. 1 is an explanatory diagram for describing "tier" in the scheme of frequency sharing studied by the FCC. Referring to FIG. 1, the three groups (i.e., three "tier") called "Incumbent Access", "Priority Access", and "General Authorized Access (GAA)" are illustrated. Each user of the frequency band is classified into one of the three groups. With respect to the use of the frequency band, the priority of "Incumbent Access" is highest, and the priority of "Priority Access" is second highest, and the priority of "GAA" is lowest.

"Incumbent Access" is a group of users who use the frequency band for "Incumbent Use". "Incumbent Access" is not requested to circumvent or reduce the interference with "Priority Access" and "GAA" having a lower priority. Also, "Incumbent Access" is protected from the interference by "Priority Access" and "GAA". In other words, the users of "Incumbent Access" use the frequency band, without considering the presence of other groups.

"Priority Access" is requested to circumvent or reduce the interference with "Incumbent Access" having a higher priority, but is not requested to circumvent or reduce the interference with "GAA" having a lower priority. Also, "Priority Access" is not protected from the interference by "Incumbent Access" having a higher priority, but is protected from the interference by "GAA" having a lower priority.

"GAA" is requested to circumvent or reduce the interference with "Incumbent Access" and "Priority Access" having a higher priority. Also, "GAA" is not protected from the interference by "Incumbent Access" and "Priority Access" having a higher priority. In other words, the users of "GAA" is "tier" to which only opportunistic use is authorized.
(Authorization of Use of Frequency Band)

With reference to FIGS. 2 to 5, an example of the authorization of the use of the frequency band will be described. FIGS. 2 to 5 is an explanatory diagram for describing an example of the authorization of the use of the frequency band.

Figure 2:
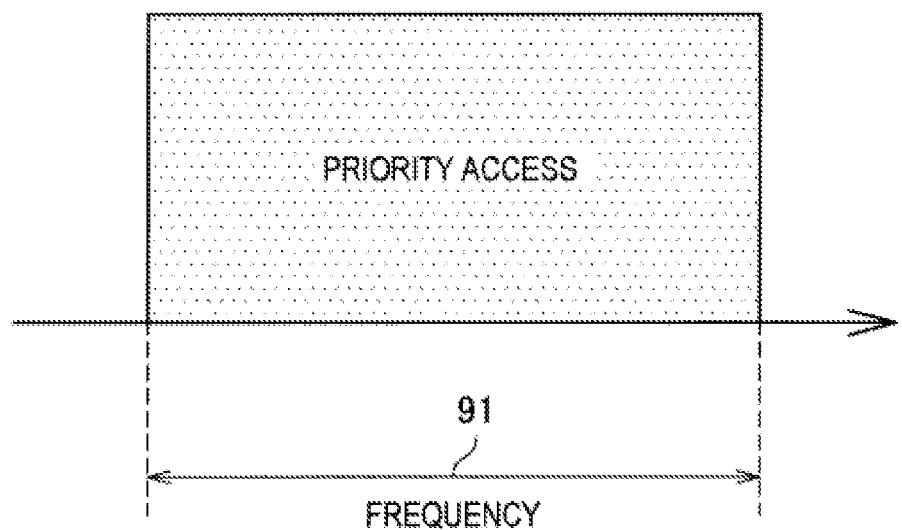
FIG. 2 is an explanatory diagram for describing a first example of authorization of use of a frequency band.

In the example of FIG. 2, in a certain area, only the users of "Priority Access" among "Priority Access" and "GAA" are authorized to use the frequency band 91.

Figure 3:
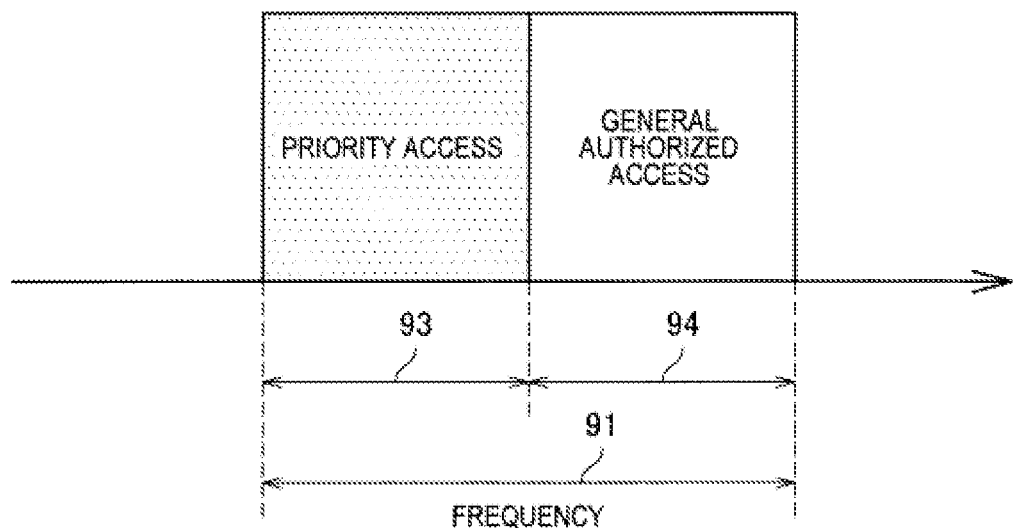
FIG. 3 is an explanatory diagram for describing a second example of authorization of use of a frequency band.

In the example of FIG. 3, in a certain area, only the users of "Priority Access" among "Priority Access" and "GAA" are authorized to use the band 93 within the frequency band 91. On the other hand, only the users of "GAA" among "Priority Access" and "GAA" are authorized to use the band 94 within the frequency band 91.

Figure 4:
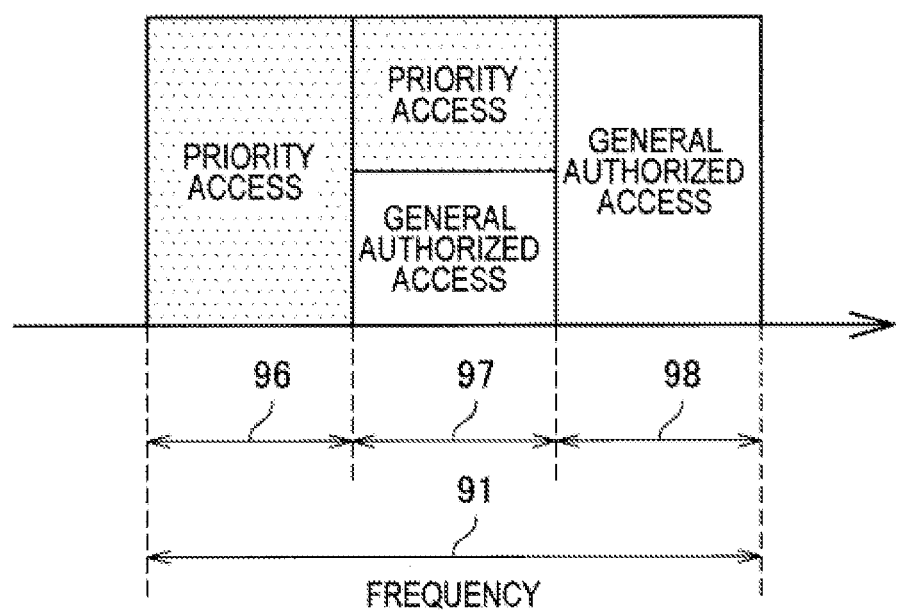
FIG. 4 is an explanatory diagram for describing a third example of authorization of use of a frequency band.

In the example of FIG. 4, in a certain area, only the users of "Priority Access" among "Priority Access" and "GAA" are authorized to use the band 96 within the frequency band 91. Only the users of "GAA" among "Priority Access" and "GAA" are authorized to use the band 98 within the frequency band 91. Further, the users of both of "Priority Access" and "GAA" can be authorized to use the band 97 within the frequency band 91. For example, the users of "Priority Access" use the band 97, without circumventing or reducing the interference with "GAA". On the other hand, the users of "GAA" use the band 97, under the condition that the circumvention or reduction of the interference with "GAA" does not give the users of "Priority Access" harmful interference.

Figure 5:
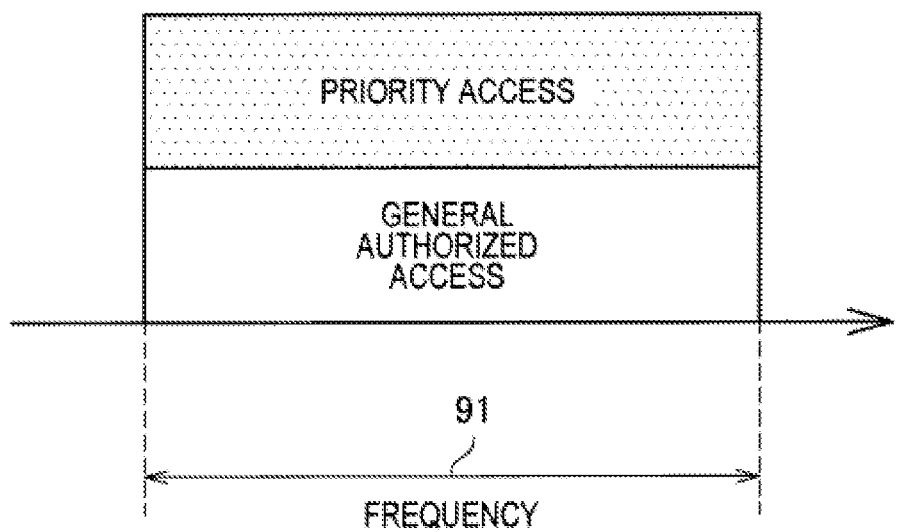
FIG. 5 is an explanatory diagram for describing a fourth example of authorization of use of a frequency band.

In the example of FIG. 5, in a certain area, the users of both of "Priority Access" and "GAA" can be authorized to use the frequency band 91. For example, the users of "Priority Access" use the band 91, without circumventing or reducing the interference with "GAA". On the other hand, the users of "GAA" use the band 91, under the condition that the circumvention or reduction of the interference with "GAA" does not give the users of "Priority Access" harmful interference.

2. Schematic Configuration of System

Figure 6:
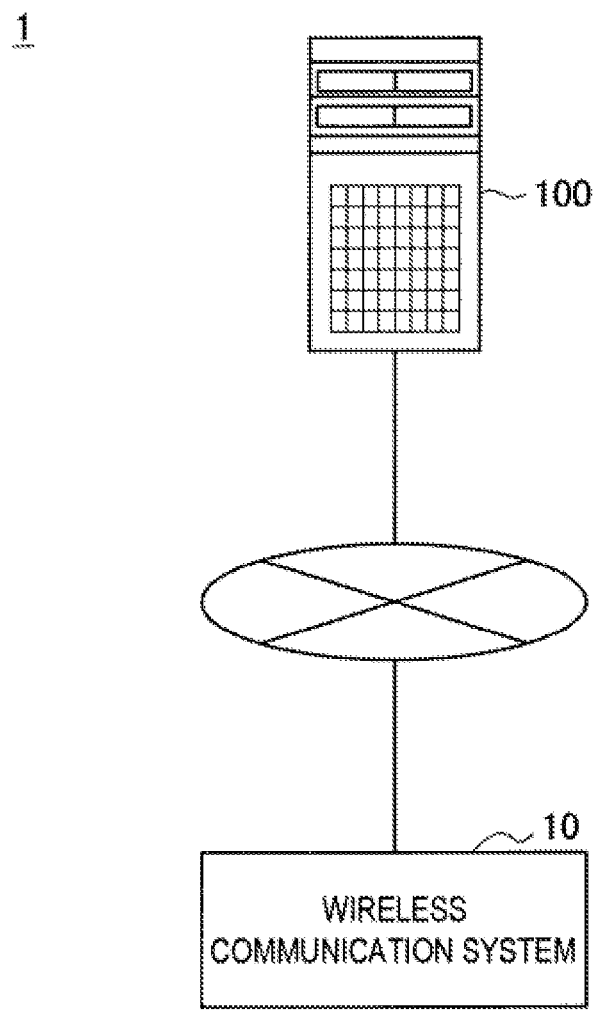
FIG. 6 is an explanatory diagram illustrating an example of a schematic configuration of a system according to an embodiment of the present disclosure.

Next, with reference to FIG. 6, a schematic configuration of a system 1 according to the embodiment of the present disclosure will be described. FIG. 6 is an explanatory diagram illustrating an example of the schematic configuration of the system 1 according to the embodiment of the present disclosure. Referring to FIG. 6, the system 1 includes a wireless communication system 10 and an information processing apparatus 100.

(Wireless Communication System 10)

The wireless communication system 10 includes a wireless communication device. For example, the wireless communication device is a base station or an access point.

Also, the wireless communication device of the wireless communication system 10 uses the frequency band to perform wireless communication with another device (for example, a terminal device). In particular, in the embodiment of the present disclosure, the wireless communication device uses the frequency band that is sharable between a plurality of wireless communication systems including the wireless communication system 10, to perform wireless communication with another device. Note that, as a matter of course, the wireless communication device may use another frequency band to perform wireless communication with another device.

As one example, the wireless communication system 10 is a cellular system. However, the wireless communication system 10 is not limited to the cellular system, but may be a wireless communication system of other type.

(Information Processing Apparatus 100)

The information processing apparatus 100 calculates a condition of use of the frequency band (hereinafter, referred to as "shared band") that is sharable between a plurality of the wireless communication systems including the wireless communication system 10. This condition is a condition of use of the shared band by the wireless communication device (for example, a base station or an access point) of the wireless communication system 10.

Further, for example, the information processing apparatus 100 authorizes the use of the shared band by the wireless communication device under the condition. As a result, the wireless communication device uses the shared band to perform wireless communication.

For example, a node of the wireless communication system 10 requests authorization of the use of the shared band by the wireless communication device of the wireless communication system 10. Then, the information processing apparatus 100 calculates a condition of use of the shared band by the wireless communication device. Thereafter, for example, the information processing apparatus 100 authorizes the use of the shared band by the wireless communication device under the condition.

Note that the information processing apparatus 100 calculates a condition of use of the shared band (and authorizes the use of the shared band), for each of two or more wireless communication systems. The wireless communication system 10 illustrated in FIG. 6 is the wireless communication system of attention (i.e., the target wireless communication system of the authorization of the use of the shared band), among the two or more wireless communication systems. For example, the wireless communication system 10 is the wireless communication system that requests the authorization of the use of the shared band, among the two or more wireless communication systems.

(Wireless Communication Systems)

For example, the plurality of the wireless communication systems include other wireless communication system having a different priority from the wireless communication system 10 with respect to the use of the shared band. That is, the plurality of the wireless communication systems include a wireless communication system having a priority higher than the wireless communication system 10 with respect to the use of the shared band, and/or a wireless communication system having a priority lower than the wireless communication system 10 with respect to the use of the shared band.

Specifically, for example, the plurality of the wireless communication systems include a wireless communication system having a first priority with respect to the use of the shared band, a wireless communication system having a second priority that is lower than the first priority with respect to the use of the shared band, and the wireless communication system having a third priority that is lower than the second priority with respect to the use of the shared band. In this case, the wireless communication system 10 is either the wireless communication system having the second priority or the wireless communication system having the third priority.

As one example, the wireless communication system having the first priority is the wireless communication system of "Incumbent Access". Further, the wireless communication system having the second priority is the wireless communication system of "Priority Access", and the wireless communication system having the third priority is the wireless communication system of "General Authorized Access (GAA)". In this case, the wireless communication system 10 is either the wireless communication system of "Priority Access" or the wireless communication system of "GAA".

Although an example having three different priorities has been described, an embodiment of the present disclosure is not limited to such an example. As one example, two different priorities may be present. That is, the plurality of the wireless communication systems may include the wireless communication system having the first priority with respect to the use of the shared band, and the wireless communication system having the second priority that is lower than the first priority with respect to the use of the shared band. As another example, four or more different priorities may be present. As yet another example, priorities are needless to be present (in other words, only one priority may be present).

3. Configuration of Information Processing Apparatus

Figure 7:
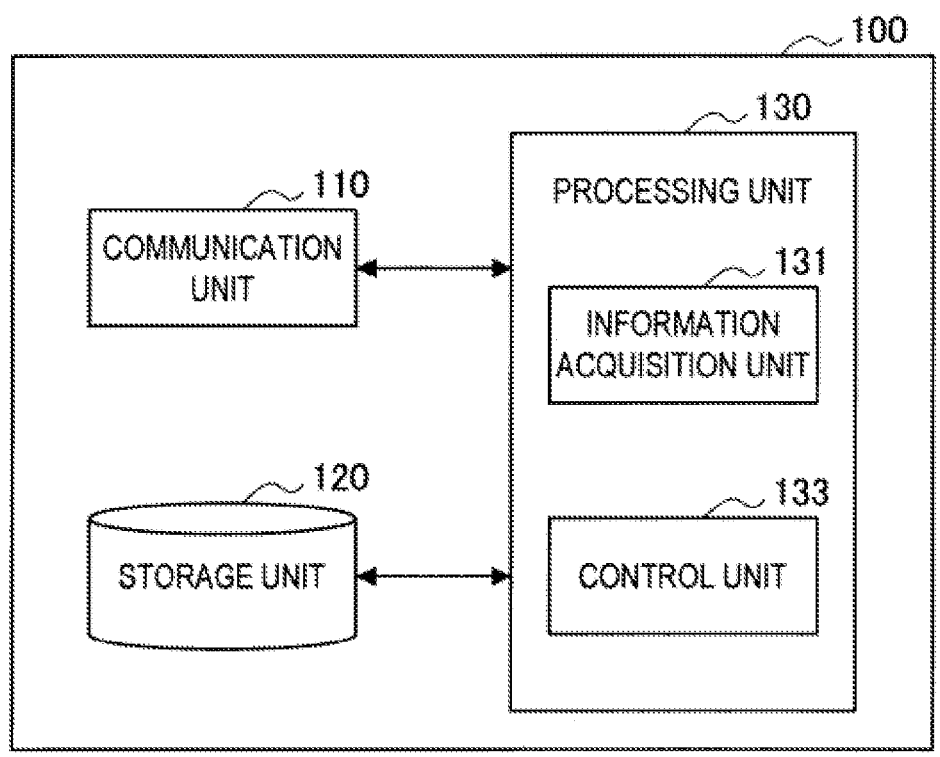
FIG. 7 is a block diagram illustrating an example of a configuration of an information processing apparatus according to the embodiment.

With reference to FIGS. 7 to 14, an example of the configuration of the information processing apparatus 100 according to the embodiment of the present disclosure will be described. FIG. 7 is a block diagram illustrating an example of the configuration of the information processing apparatus 100 according to the embodiment of the present disclosure. Referring to FIG. 7, the information processing apparatus 100 includes a communication unit 110, a storage unit 120, and a processing unit 130.

(Communication Unit 110)

The communication unit 110 transmits and receives information. For example, the communication unit 110 transmits information to another node, and receives information from another node. For example, the other node includes a node of the wireless communication system 10.

(Storage Unit 120)

The storage unit 120 temporarily or permanently stores programs and data for the operation of the information processing apparatus 100.

(Processing Unit 130)

The processing unit 130 provides various functions of the information processing apparatus 100. The processing unit 130 includes an information acquisition unit 131 and a control unit 133. Note that the processing unit 130 may further include additional components other than these components. In other words, the processing unit 130 may also execute operation other than the operation of these component.

Information Acquisition Unit 131

(a) Information Relevant to Wireless Communication System

The information acquisition unit 131 acquires information relevant to the wireless communication system 10.

(a-1) Position Related Information and Height Related Information

The information acquisition unit 131 acquires position related information relevant to the position of the wireless communication device of the wireless communication system 10, and height related information relevant to the height of the wireless communication device.

Wireless Communication Device

For example, the wireless communication device is a base station or an access point of the wireless communication system 10.

The wireless communication device may be a terminal device that operates as a base station or an access point (i.e., a terminal device having a base station function or an access point function), a device that performs D2D communication, or a moving relay base station.

Position Related Information

Position

For example, the position related information is information indicating the position of the wireless communication device.

As one example, the position related information is position information of the position measuring system. For example, the position measuring system is a GPS (Global Positioning System), and the position related information includes latitude information and longitude information.

As another example, the position related information may be information indicating the position that is estimated on the basis of a radio wave strength, an AoA (Angle of Arrival), and/or a TA (Timing Advance) value, for example. The radio wave strength may be the strength in another device of the radio wave transmitted by the wireless communication device, or may be the strength in the wireless communication device of the radio wave transmitted by another device. The AoA is the arrival angle of the radio wave, and may be the arrival angle, at another device, of the radio wave transmitted by the wireless communication device, and may be the arrival angle, at the wireless communication device, of the radio wave transmitted by another device. In this case, the wireless communication device may be a terminal device that operates as a base station or an access point, a device that performs D2D communication, or a moving relay base station.

As yet another example, the position related information may be information indicating an address.

Note that, as a matter of course, the information indicating the position of the wireless communication device is not limited to an example described above, but may be information other than the example described above.

Area

The position related information may be information indicating an area in which the wireless communication device is positioned. The area may be an area of each wireless communication device of the wireless communication system 10, or may be an area in which two or more wireless communication devices of the wireless communication system 10 are positioned.

Others

The position related information is not limited to an example described above. For example, the position related information may be information for identifying the position of the wireless communication device. As one example, the position related information may be information indicating a radio wave strength, an AoA (Angle of Arrival), and/or a TA (Timing Advance) value, for example. In this case, the wireless communication device may be a terminal device that operates as a base station or an access point, a device that performs D2D communication, or a moving relay base station.

Height Related Information

For example, the height related information is information relevant to the height of the antenna in the wireless communication device. Note that, when the accuracy of the height may be low for example, the height related information may be the height of a part other than the antenna in the wireless communication device.

For example, the height related information is information indicating the position of the wireless communication device. Specifically, for example, the height related information is information indicating an elevation, an altitude, a ground height, a height above sea level, or a depth of the position measuring system (for example, GPS). Note that the height related information may be information indirectly indicating the position of the wireless communication device. Specifically, the height related information may be information indicating a floor, an air pressure, a water pressure, or the like of the building.

(a-2) Other Information

The information acquisition unit 131 may further acquire other information relevant to the wireless communication system 10.

Antenna

The information acquisition unit 131 may acquire information (hereinafter, "antenna related information") relevant to the antenna of the wireless communication device of the wireless communication system 10.

The antenna related information may indicate the antenna dimension (for example, 1D, 2D, or 3D), polarized wave information, the number of the antenna elements, the interval between the antenna elements, the antenna size, the direction of the antenna, the applicable transmission mode, or the formable beam pattern (for example, the usable weight coefficient set), for example.

Note that the antenna related information may indicate a ZoD (Zenith of Direction, Departure). The ZoD is a kind of radio wave arrival angle. The ZoD may be estimated by another device on the basis of the radio wave radiated from the antenna of the wireless communication device. In this case, the wireless communication device may be a terminal device that operates as a base station or an access point, a device that performs D2D communication, or a moving relay base station. The ZoD can be estimated by the radio wave arrival direction estimation technology, such as MUSIC (Multiple Signal Classification) or ESPRIT (Estimation of Signal Propagation via Rotation Invariance Techniques).

Device Class

The information acquisition unit 131 may acquire information relevant to the device class of the wireless communication device of the wireless communication system 10.

The information relevant to the device class may indicate the device class, or may indicate parameters prescribed in the device class (for example, the maximum transmission electric power).

Priority

The information acquisition unit 131 may acquire information relevant to the priority of the wireless communication system 10 with respect to the use of the shared band (i.e., the frequency band that is sharable between a plurality of the wireless communication systems including the wireless communication system 10). The information relevant to the priority may indicate the priority.

As one example, the priority may be "Priority Access" or "GAA".

Request

The information acquisition unit 131 may acquire information relevant to the request of the wireless communication system 10 with respect to the use of the shared band.

As one example, the information relevant to the request may indicate a desired band width or a desired period, for example.

Type of User and System

The information acquisition unit 131 may acquire information relevant to user type of the wireless communication system 10. The information relevant to the user type may indicate the user type. The user type may be a business operator, an individual, or a public organization, for example.

The information acquisition unit 131 may acquire information relevant to system type of the wireless communication system 10. The information relevant to the system type may indicate the system type. The system type may be a digital enhanced cordless telecommunication (DECT) or a disaster prevention wireless system, for example.

CAU and CAF

When the shared band is the target frequency band of the frequency sharing scheme studied in the FCC, the information acquisition unit 131 may acquire information relevant to a contained access user (CAU) or a contained access facility (CAF). The information may indicate that the wireless communication system 10 is a system of the CAU or of the CAF, and may indicate the detailed information relevant to the CAU or the CAF.

Others

As a matter of course, the information acquisition unit 131 may acquire information other than the information described above. As one example, the information acquisition unit 131 may acquire information indicating an operation form, an operation purpose or the like of the wireless communication system 10 after the authorization of the use of the shared band.

(a-3) Method for Acquiring Information

For example, when requesting authorization of use of the shared band, the node of the wireless communication system 10 provides the information processing apparatus 100 with the position related information and the height related information (and other information described above), and the position related information and the height related information (and the other information) are stored in the storage unit 120. At a subsequent time, the information acquisition unit 131 acquires the position related information and the height related information (and the other information), from the storage unit 120.

Note that the position related information and the height related information (and other information described above) may be provided by the node of the wireless communication system 10 periodically or in response to occurrence of an event. The event may include change of the installation site of the wireless communication device, transfer of the wireless communication device (for example, when the wireless communication device a terminal device that operates as a base station or an access point, a device that performs D2D communication, or a moving relay base station), change of the beam pattern, and/or change of ON and OFF state, for example.

Also, at least a part of the position related information and the height related information (and other information described above) may be provided by another node that is not a node of the wireless communication system 10. Alternatively, at least a part of the position related information and the height related information (and other information described above) may be held in advance by the information processing apparatus 100.

(b) Information Relevant to Shared Band

For example, the information acquisition unit 131 acquires information relevant to the shared band.

For example, the information relevant to the shared band includes information indicating the band width of the shared band, information indicating the center frequency of the shared band, and/or information indicating the situation of the authorization of the use of the shared band, for example.

For example, the information relevant to the shared band is stored in the storage unit 120, and the information acquisition unit 131 acquires the information relevant to the shared band, from the storage unit 120.

(c) Information Relevant to Other Wireless Communication System (Other-System Related Information)

For example, the information acquisition unit 131 acquires information relevant to other wireless communication systems (hereinafter, referred to as "other-system related information") that use the shared band (i.e., the frequency band sharable between a plurality of wireless communication systems including the wireless communication system 10).

(c-1) Other Wireless Communication System

Priority of Other Wireless Communication System

First Example: Higher Priority

As a first example, the other wireless communication system is a wireless communication system having a priority that is higher than the priority of the wireless communication system 10 with respect to the use of the shared band.

As one example, the wireless communication system 10 is a wireless communication system of "Priority Access", and the other wireless communication system is a wireless communication system of "Incumbent Access". As another example, the wireless communication system 10 is a wireless communication system of "GAA", and the other wireless communication system is a wireless communication system of "Incumbent Access" or a wireless communication system of "Priority Access".

Thereby, for example, interference with the other wireless communication system having a higher priority is circumvented or reduced.

Second Example: Same or Higher Priority

As a second example, the other wireless communication system may be a wireless communication system having a priority that is equal to or higher than the priority of the wireless communication system 10 with respect to the use of the shared band.

As one example, the wireless communication system 10 is a wireless communication system of "Priority Access", and the other wireless communication system is a wireless communication system of "Incumbent Access" or a wireless communication system of "Priority Access". As another example, the wireless communication system 10 is a wireless communication system of "GAA", and the other wireless communication system is a wireless communication system of "Incumbent Access", a wireless communication system of "Priority Access", or a wireless communication system of "GAA".

Thereby, for example, interference with the other wireless communication system having the same priority is circumvented or reduced.

Two or More Other Wireless Communication Systems

As a matter of course, the information acquisition unit 131 may acquire the other-system related information, with respect to each of a plurality of other wireless communication systems that use the shared band.

Wireless Communication System Under Control of Other Device

Note that the other wireless communication system may include a wireless communication system that is authorized to use the shared band by another device that is different from the information processing apparatus 100 (i.e., an apparatus that authorizes the use of the shared band by the wireless communication device of the wireless communication system 10).

(c-2) Position Related Information and Height Related Information

For example, the other-system related information includes position related information relevant to the position of the wireless communication device of the other wireless communication system, and height related information relevant to the height of the wireless communication device of the other wireless communication system.

The description of the position related information and the height related information of the other wireless communication system is same as the description of the position related information and the height related information of the wireless communication system 10, except that the target devices are different from each other. Thereby, here, duplicative description will be omitted.

Thereby, for example, it is possible to recognize where the wireless communication device of the other wireless communication system is positioned in the space.

(c-3) Band Use Related Information

For example, the other-system related information includes information (hereinafter, referred to as "band use related information") relevant to the use of the shared band by the wireless communication device of the other wireless communication system. Thereby, for example, the interference with the other wireless communication system is circumvented or reduced, in consideration of the use of the shared band by the other wireless communication system.

Band

For example, the band use related information includes information indicating the band that the wireless communication device of the other wireless communication system is able to use, in the shared band. Thereby, for example, it is possible to recognize a band in which the interference with the other wireless communication system has to be circumvented or reduced.

Maximum Transmission Electric Power

For example, the band use related information includes information indicating the maximum transmission electric power of the wireless communication device of the other wireless communication system with respect to the shared band. Thereby, for example, it is possible to recognize a space in which the interference with the other wireless communication system has to be circumvented or reduced.

Request Relevant to Wireless Communication

For example, the band use related information includes information relevant to a request to the wireless communication of the other wireless communication system.

As one example, the band use related information includes information indicating an acceptable level of the wireless communication device of the other wireless communication system with respect to the interference. Thereby, for example, the interference with the other wireless communication system is limited to the acceptable level or below.

As another example, the band use related information may include information indicating a request of quality of service (QoS) of the other wireless communication system. The request may be the minimum reception electric power level that is suitable for operation of the service of the other wireless communication system. For example, this prevents a situation in which the QoS of the other wireless communication system does not meet the request.

Condition of Beam Forming

The band use related information may include information indicating the condition of beam forming by the wireless communication device of the other wireless communication system with respect to the shared band. Thereby, for example, when the beam forming is performed in the other wireless communication system, it is possible to recognize a space in which the interference with the other wireless communication system has to be circumvented or reduced.

Space

The band use related information may include information indicating the space where the wireless communication device of the other wireless communication system is able to use the shared band. Alternatively, the band use related information may include information indicating the exclusion space of the other wireless communication system with respect to the shared band.

The space or the exclusion space may be a space that is calculated when the use of the shared band is authorized by the another wireless communication device, or may be a space that is set in advance. As one example, the other wireless communication system may be a wireless communication system of "Incumbent Access", and the exclusion space may be a three dimensional exclusion zone that is set in advance.

Thereby, for example, it is possible to recognize a space in which the interference with the other wireless communication system has to be circumvented or reduced.

Period

The band use related information may include information indicating a period within which the wireless communication device of the other wireless communication system is able to use the shared band. Thereby, for example, it is possible to recognize a period within which the interference with the other wireless communication system has to be circumvented or reduced.

(c-4) Other Information

The information acquisition unit 131 may further acquire other information relevant to another wireless communication device.

Antenna

The other-system related information may acquire information relevant to an antenna of the wireless communication device of the other wireless communication system.

The information relevant to the antenna may indicate the antenna dimension (for example, 1D, 2D or 3D), polarized wave information, the number of the antenna elements, the interval between the antenna elements, the antenna size, the direction of the antenna, the applicable transmission mode, or the formable beam pattern (for example, the usable weight coefficient set), for example. Note that the information relevant to the antenna may indicate a ZoD.

Device Class

The other-system related information may acquire information relevant to the device class of the wireless communication device of the other wireless communication system.

The information relevant to the device class may indicate the device class, or may indicate parameters prescribed in the device class.

Type of User and System

The other-system related information may include information relevant to the user type of the other wireless communication system. The information relevant to the user type may indicate the user type. The user type may be a business operator, an individual, or a public organization, for example.

The other-system related information may include information relevant to the system type of the other wireless communication system. The information relevant to the system type may indicate the system type. The system type may be a DECT or a disaster prevention wireless system.

(c-5) Method for Acquiring Information

For example, the other-system related information is stored in the storage unit 120, and the information acquisition unit 131 acquires the other-system related information, from the storage unit 120.

Note that, at least a part of the other-system related information may be stored in another device other than the information processing apparatus 100 (for example, a database), and the information acquisition unit 131 may acquire the part of the other-system related information from the other device.

At least a part of the other-system related information be may be provided to the information processing apparatus 100 by the other wireless communication system, in response to a request to the other wireless communication system by the information processing apparatus 100. Also, when the other wireless communication system is under control of another device other than the information processing apparatus 100, at least a part of the other-system related information may be provided to the information processing apparatus 100 by the other device, in response to the request to the other device by the information processing apparatus 100.

(Control Unit 133)

(a) Calculation of Band Use Condition

The control unit 133 calculates a condition (hereinafter, referred to as "band use condition") of the use by the wireless communication device of the shared band, on the basis of the position related information relevant to the position of the wireless communication device of the wireless communication system 10, and the height related information relevant to the height of the wireless communication device. As described above, the shared band is the frequency band sharable between a plurality of the wireless communication systems including the wireless communication system 10.

For example, the control unit 133 calculates the band use condition, on the basis of the position related information, the height related information, and the other-system related information.

(a-1) Band Use Condition

Usable Band

For example, the band use condition includes the band (hereinafter, referred to as "usable band") that the wireless communication device is able to use, in the shared band.

For example, this enables the wireless communication device to use the usable band which is a part of the shared band, even though the shared band is unable to be used in its entirety. Hence, the utilization efficiency of the shared band improves.

Usable Space

For example, the band use condition includes a space where the wireless communication device is able to use the shared band (hereinafter, "usable space").

For example, the usable space is a space where the reception electric power of a signal that the wireless communication device uses the shared band to transmit is allowed to be equal to greater than a predetermined electric power. In other words, the usable space is any space other than the space where the reception electric power of the signal that the wireless communication device uses the shared band to transmit is to be smaller than the predetermined electric power.

For example, this enables the wireless communication device to use the shared band in the limited space, even though the shared band is unable to be used in the entire space. For example, the wireless communication device can use the shared band with a reduced transmission electric power, even though the shared band is unable to be used with the maximum transmission electric power. Hence, the utilization efficiency of the shared band improves.

Note that the usable space is not limited to the space where the wireless communication device is able to use all of the shared band, but may be a space where the wireless communication device is able to use a part of the shared band.

Also, the usable space may be an exclusion space of the wireless communication system 10 with respect to the shared band (i.e., a space where the wireless communication device of another wireless communication system other than the wireless communication system 10 is unable to use a part or all of the shared band).

Maximum Transmission Electric Power

The band use condition may include the maximum transmission electric power of the wireless communication device with respect to the shared band. The band use condition may include the maximum transmission electric power, instead of the usable space. Alternatively, the band use condition may include the maximum transmission electric power, in addition to the usable space.

For example, this enables the wireless communication device to use the shared band with a reduced transmission electric power, even though the shared band is unable to be used with the maximum transmission electric power. For example, the wireless communication device can use the shared band in the limited space, even though the shared band is unable to be used in the entire space. Hence, the utilization efficiency of the shared band improves.

Beam Forming Condition

The band use condition may include a condition of the beam forming by the wireless communication device with respect to the shared band (hereinafter, referred to as "beam forming condition").

The beam forming condition may include the direction of the beam that the wireless communication device is able to form. Alternatively, the beam forming condition may include a weight set for beam forming, which the wireless communication device is able to use. Further, the beam forming condition may include the maximum transmission electric power of each beam (or of each weight set of beam forming).

Beam forming by the wireless communication device may be beam forming of a large scale multiple-input and multiple-output (MIMO) (in other words, beam forming of a massive MIMO or three dimensional beam forming). The beam that the wireless communication device is able to form may include beams of different tilt angles (i.e., beams that are different in vertical direction).

For example, this enables the wireless communication device to use the shared band to radiate a directional beam, even though omnidirectional radio wave is unable to be radiated using the shared band. Hence, the utilization efficiency of the shared band improves.

Note that the band use condition may include a usable space when beam forming is performed, instead of the beam forming condition.

Period

The band use condition may include a period within which the wireless communication device is able to use the shared band (hereinafter, referred to as "usable period").

For example, this enables the wireless communication device to use the shared band within the limited period, even though the shared band is unable to be used at all times. Hence, the utilization efficiency of the shared band improves.

As above, for example, the band use condition includes the usable band and/or the usable space. Also, the band use condition may include the maximum transmission electric power, the beam forming condition, and/or the usable period. Note that, when the usable band includes two or more bands, the band use condition may include the usable space, the maximum transmission electric power, the beam forming condition, and/or the usable period, with respect to each of the two or more bands.

(a-2) Circumvention or Reduction of Interference with Other Wireless Communication System Other Wireless Communication System
Higher Priority For example, the control unit 133 calculates the band use condition, so as to circumvents or reduces the interference with another wireless communication system having a priority higher than the priority of the wireless communication system 10 with respect to the use of the shared band.

As one example, when the wireless communication system 10 is a wireless communication system of "Priority Access", the control unit 133 decides the band use condition so as to circumvent or reduce the interference with the wireless communication system of "Incumbent Access".

As another example, when the wireless communication system 10 is a wireless communication system of "GAA", the control unit 133 decides the band use condition, so as to circumvent or reduce the interference with the wireless communication system of "Incumbent Access" and the wireless communication system of "Priority Access".

Thereby, for example, the shared band is used according to priority.

Same Priority

The control unit 133 may calculate the band use condition, so as to additionally circumvent or reduce the interference with the other wireless communication system having a priority that is same as the priority of the wireless communication system 10 with respect to the use of the shared band.

As one example, when the wireless communication system 10 is a wireless communication system of "Priority Access", the control unit 133 may decide the band use condition, so as to additionally circumvent or reduce the interference with the other wireless communication system of "Priority Access".

As another example, when the wireless communication system 10 is a wireless communication system of "GAA", the control unit 133 may decide the band use condition, so as to additionally circumvent or reduce the interference with the wireless communication system of "GAA".

Thereby, for example, interference between wireless communication systems of a same priority is additionally circumvented or reduced.

Specific Condition

As a first example, the band use condition is a condition that reduces the level of the interference with the another system to the acceptable level of the other wireless communication system or below.

As a second example, the band use condition may be a condition that does not lower the QoS of the other wireless communication system below a request level.

As a third example, the band use condition includes a space where the wireless communication device is able to use the shared band, and the space may be a space that does not overlap the space where the wireless communication device of the other wireless communication system is able to use the shared band.

For example, this enables the wireless communication device to use the shared band, without having harmful influence on wireless communication of the other wireless communication system.

(a-3) Method of Deciding Use Condition

Specific Example

For example, the shared band includes a plurality of unit bands. Then, the control unit 133 calculates a space where the wireless communication device is able to use the unit band (i.e., the usable space) for each unit band, on the basis of the position related information, the height related information, and the other-system related information.

Specifically, for example, the control unit 133 calculates a level of the interference with the other wireless communication system having a priority that is higher than the priority of the wireless communication system 10 (specifically, the interference with the wireless communication device of the other wireless communication system), with respect to each of a plurality of transmission electric power candidates of the wireless communication device. Then, the control unit 133 compares the level of the interference with respect to each of the transmission electric power candidates, with the acceptable level of the other wireless communication system. When the level of the interference for any of the transmission electric power candidates exceeds the acceptable level, the control unit 133 determines that the wireless communication device is unable to use the unit band. On the other hand, when the level of the interference is equal to or lower than the acceptable level with respect to one or more transmission electric power candidates of the transmission electric power candidates, the control unit 133 determine that the wireless communication device is able to use the unit band, and selects the maximum transmission electric power candidate from among the one or more transmission electric power candidates. Then, the control unit 133 calculates the space corresponding to the selected transmission electric power candidate, as the usable space (i.e., the space where the wireless communication device is able to use the unit band), on the basis of the selected transmission electric power candidate, the position related information, and the height related information. For example, the space corresponding to the selected transmission electric power candidate (i.e., the usable space) is a space where the reception electric power of a signal that the wireless communication device transmits with the selected transmission electric power candidate is equal to or greater than a predetermined electric power. A specific example of the space is described in detail later with reference to FIG. 8.

Thereby, for example, one or more unit bands that the wireless communication device is able to use among the unit bands are calculated, and a usable space is calculated for each of the one or more unit bands. In short, the band use condition including the usable band and the usable space is calculated. Alternatively, it is determined that all of the unit bands are unable to use the wireless communication device.

Other Variations

As a matter of course, the method of calculating the band use condition is not limited to an example described above. For example, various other methods may be used as described below.

Consideration of Other Wireless Communication Device

The usable space may be calculated, in consideration of presence of another wireless communication device (for example, a terminal device) that performs wireless communication with the wireless communication device (for example, a base station).

For example, as described above, the control unit 133 calculates a level of the interference with the other wireless communication system, with respect to each of the transmission electric power candidates. Here, the level of the interference may include not only the interference by the signal transmitted by the wireless communication device, but also the interference by the signal transmitted by the other wireless communication device (for example, the terminal device) that performs wireless communication with the wireless communication device (for example, the base station). The other wireless communication device (for example, the terminal device) may be assumed to be present at a position at which the reception electric power of a signal transmitted by the wireless communication device (for example, the base station) with the transmission electric power candidate is equal to a predetermined electric power (for example, a cell edge when a signal is transmitted with the transmission electric power candidate). As a result, in this method, the selected maximum transmission electric power candidate is a smaller transmission electric power candidate.

Also, for example, as described above, the control unit 133 calculates the space corresponding to the selected transmission electric power candidate, as the usable space, on the basis of the selected transmission electric power candidate, the position related information, and the height related information. Here, the space corresponding to the selected transmission electric power candidate (i.e., the usable space) is not only the space where the reception electric power of a signal transmitted by the wireless communication device (for example, the base station) with the selected transmission electric power candidate is equal to or greater than a predetermined electric power, but may include an additional space. For example, the space (i.e., the usable space) may further include a space where the reception electric power of a signal transmitted by the other wireless communication device (for example, the terminal device) that performs the wireless communication with the wireless communication device (for example, the base station) is equal to or greater than a predetermined electric power. A specific example of the space is described in detail later with reference to FIG. 9.

QoS

In the example described above, with respect to each of the transmission electric power candidates, the level of the interference with the other wireless communication system is calculated, and the level of the interference and the acceptable level are compared with each other. Instead of this calculation and the comparison, QoS of the other wireless communication system (specifically, QoS of the wireless communication device of the other wireless communication system) is calculated, and this QoS and the request of QoS may be compared with each other, with respect to each of the transmission electric power candidates.

Space in which Wireless Communication Device of Other Wireless Communication System is Able to Use Shared Band In the example described above, with respect to each of the transmission electric power candidates, the level of the interference with the other wireless communication system is calculated, and the level of the interference and the acceptable level are compared with each other. Instead of this calculation and the comparison, a space that does not overlap the space where the wireless communication device of the other wireless communication system is able to use the shared band may be calculated as the usable space (i.e., the space where the wireless communication device of the wireless communication system 10 is able to use the shared band). A specific example of the space is described in detail later with reference to FIG. 12. The space where the wireless communication device of the other wireless communication system is able to use the shared band may be calculated in advance, or may be newly calculated.

Note that all space except the space where the wireless communication device of the other wireless communication system is able to use the shared band may be calculated as the usable space (i.e., the space where the wireless communication device of the wireless communication system 10 is able to use the shared band). A specific example of the space is described in detail later with reference to FIG. 13.

Beam Forming

When the wireless communication device supports beam forming, the process may be performed with respect to each of a plurality of beam candidates formed by the wireless communication device (in other words, with respect to each of a plurality of weight set candidates used by the wireless communication device). As a result, the band use condition further including the beam forming condition may be calculated. Alternatively, the usable space when the beam forming is performed may be calculated. An example of the usable space calculated by this method is described in detail later with reference to FIG. 11.

Single Band

When the shared band does not include a plurality of unit bands but a single band, the process may be performed for the shared band, instead of each unit band.

Period

In some cases, the other wireless communication system is allowed to use the shared band in a limited period. For example, there is a case where the duplex method of the other wireless communication system is time division duplex (TDD), and a case where the other wireless communication system is a radar system that transmits a pulse signal periodically. In such cases, the process may be performed, for each period. As a result, the band use condition including the usable period may be calculated.

Note that the usable space of the wireless communication device of the wireless communication system 10 in a certain period, and the usable space (or the exclusion space) of the wireless communication device of the other wireless communication system in another period may overlap each other. As a matter of course, these spaces do not overlap in a same period.

Same Priority, Etc

The other wireless communication system is needless to be another wireless communication system having a priority higher than the priority of the wireless communication system 10, but may be another wireless communication system having a priority same as the priority of the wireless communication system 10. Further, in this case, the usable space for the wireless communication system 10, and the usable space (or the exclusion space) for the other wireless communication system may be reconciled. This reconciliation may be performed to keep the fairness, or may be performed on the basis of use fees of the both (of the shared band).

When the wireless communication system 10 uses the shared band by reasons such as urgency or communality, the usable space for the wireless communication system 10 and the usable space (or the exclusion space) for the other wireless communication system may be reconciled in such a manner that the usable space for the wireless communication system 10 is prioritized.

Plurality of Other Wireless Communication Systems

A plurality of other wireless communication systems may be present. When the maximum transmission electric power candidate is selected for each of the other wireless communication systems, the minimum transmission electric power candidate may be selected ultimately, from among all the selected transmission electric power candidates. Thereafter, the usable space may be calculated, on the basis of the ultimately selected transmission electric power candidate, the position related information, and the height related information. Note that the other wireless communication systems may include another wireless communication system having a priority same as the priority of the wireless communication system 10.

Case in which Space where Shared Band is Usable is Set in Advance

Although, in the example, the band use condition is calculated on the basis of the other-system related information, the present disclosure is not limited to such an example. For example, the band use condition may be calculated on the basis of the position related information and the height related information only, when the space where the wireless communication system 10 is able to use the shared band is set in advance, in the same way as the area of television white space frequency spectrum (TVWS) or REM (Radio Environment Map). Also, for example, when a look-up table that associates position and height with band use condition is prepared, the band use condition may be calculated on the basis of the position related information and the height related information only.

Maximum Transmission Electric Power

Instead of selecting the maximum transmission electric power candidate from among the one or more transmission electric power candidates, and calculating the space corresponding to the selected transmission electric power candidate as the usable space, the maximum transmission electric power candidate may be selected as the maximum transmission electric power of the wireless communication device. As a result, the band use condition including the maximum transmission electric power may be calculated, instead of the usable space.

Arbitrary Space

Instead of selecting the maximum transmission electric power candidate from among the one or more transmission electric power candidates, and calculating the space corresponding to the selected transmission electric power candidate as the usable space, the arbitrary space may be calculated as the usable space. As one example, a preset space may be selected as the usable space. An example of this space will be described in detail later with reference to FIG. 14.

(a-4) Specific Example

With reference to FIGS. 8 to 14, a specific example of the usable space calculated will be described. FIGS. 8 to 14 are explanatory diagrams for describing first to seventh examples of the usable space for the wireless communication system 10.

First Example

Figure 8:
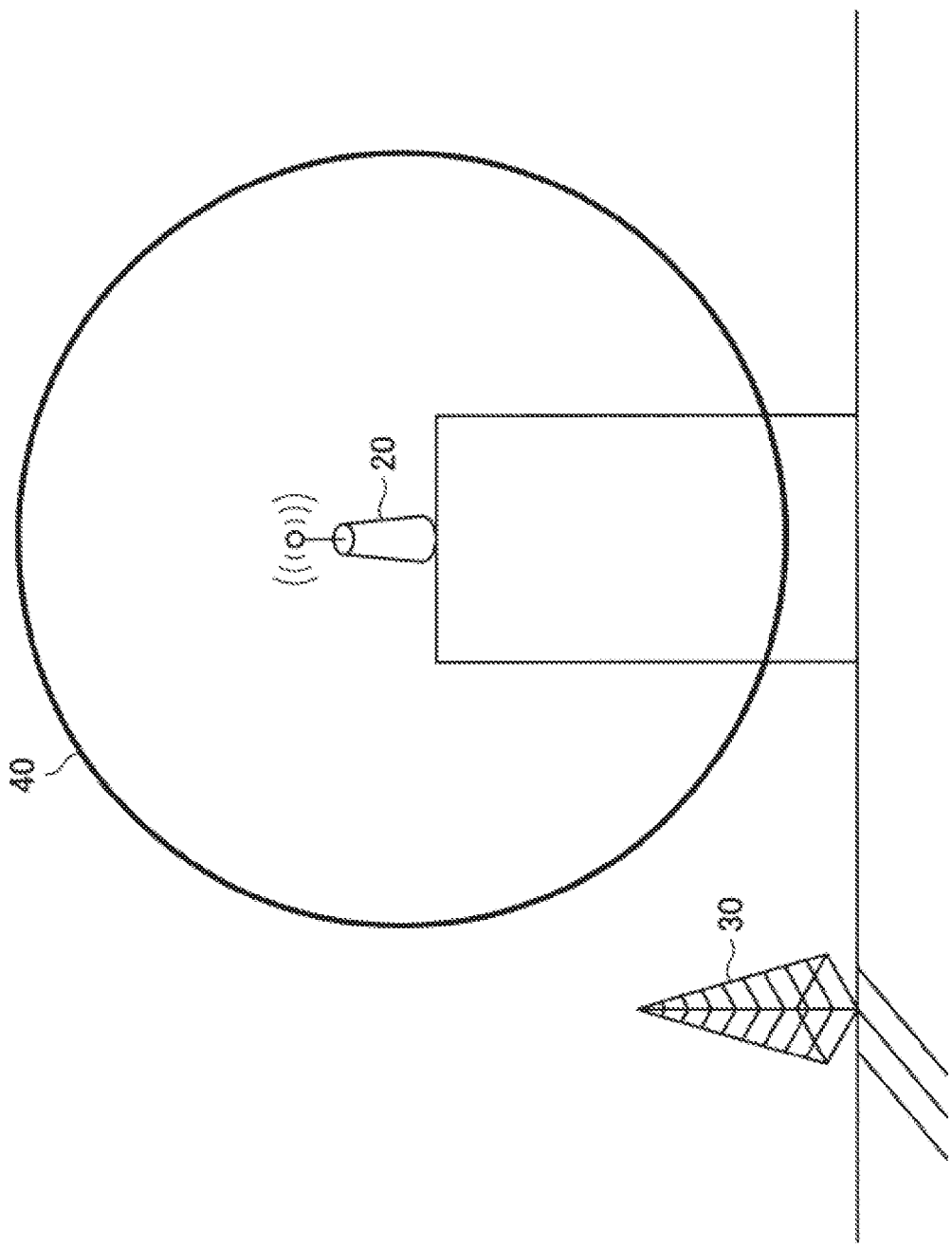
FIG. 8 is an explanatory diagram for describing a first example of a usable space.

Referring to FIG. 8, a wireless communication device 20 of the wireless communication system 10, and a wireless communication device 30 of another wireless communication system are illustrated. The wireless communication device 20 is a base station of the wireless communication system 10, and the wireless communication device 30 is a receiver device. In this case, for example, when the wireless communication device 20 transmits a signal with the maximum transmission electric power, the level of the interference with the wireless communication device 30 exceeds the acceptable level of the other wireless communication system. Hence, a transmission electric power candidate that lowers the level of the interference with the wireless communication device 30 to the acceptable level or below is selected, and a space corresponding to the transmission electric power candidate (for example, a space in which the reception electric power of a signal transmitted by the wireless communication device 20 with the transmission electric power candidate is equal to or greater than a predetermined electric power) is calculated as a usable space 40. Then, the use of the shared band by the wireless communication device 20 is authorized under the use condition including the usable space 40.

Note that, for example, even if the wireless communication device 20 transmits a signal with the maximum transmission electric power, the space corresponding to the maximum transmission electric power is calculated as the usable space 40, when the level of the interference with the wireless communication device 30 is equal to or smaller than the acceptable level of the other wireless communication system.

Second Example

Figure 9:
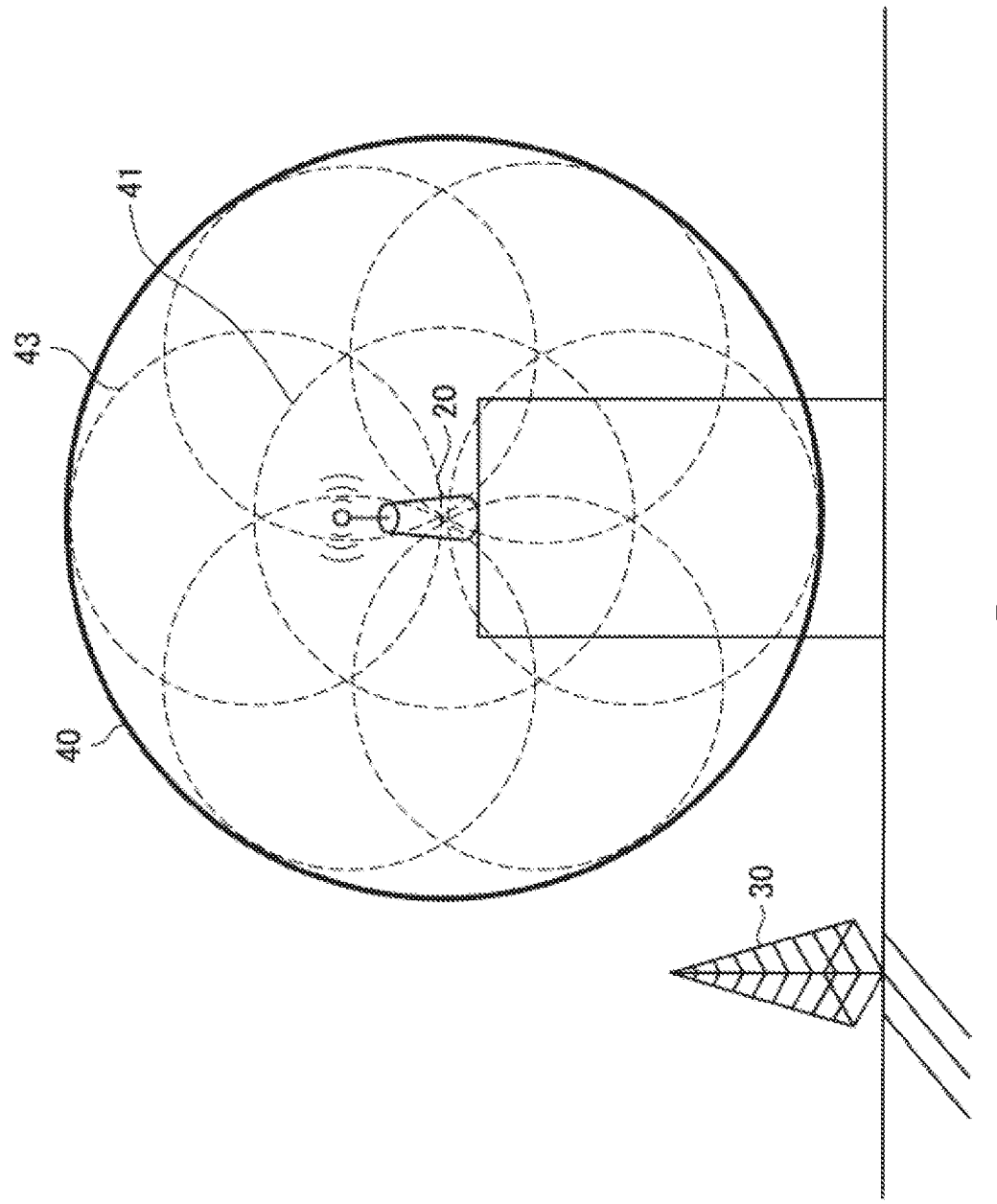
FIG. 9 is an explanatory diagram for describing a second example of a usable space.

Referring to FIG. 9, a wireless communication device 20 of the wireless communication system 10, and a wireless communication device 30 of another wireless communication system are illustrated, in the same way as FIG. 8. In this example, the transmission electric power candidate (of the wireless the communication device 20) that lowers the level of the interference with the wireless communication device 30 to the acceptable level or below is selected, in consideration of the presence of another wireless communication device (for example, the terminal device) that performs wireless communication with the wireless communication device 20 (for example, the base station). In other words, a transmission electric power candidate that is smaller than the example illustrated in FIG. 8 is selected. For example, the usable space 40 including the space 41 in which the reception electric power of the signal transmitted by the wireless communication device 20 with the transmission electric power candidate is equal to or greater than a predetermined electric power, and the space 43 in which the signal transmitted by the another wireless communication device is equal to or greater than the predetermined electric power, is calculated.

Third Example

Figure 10:
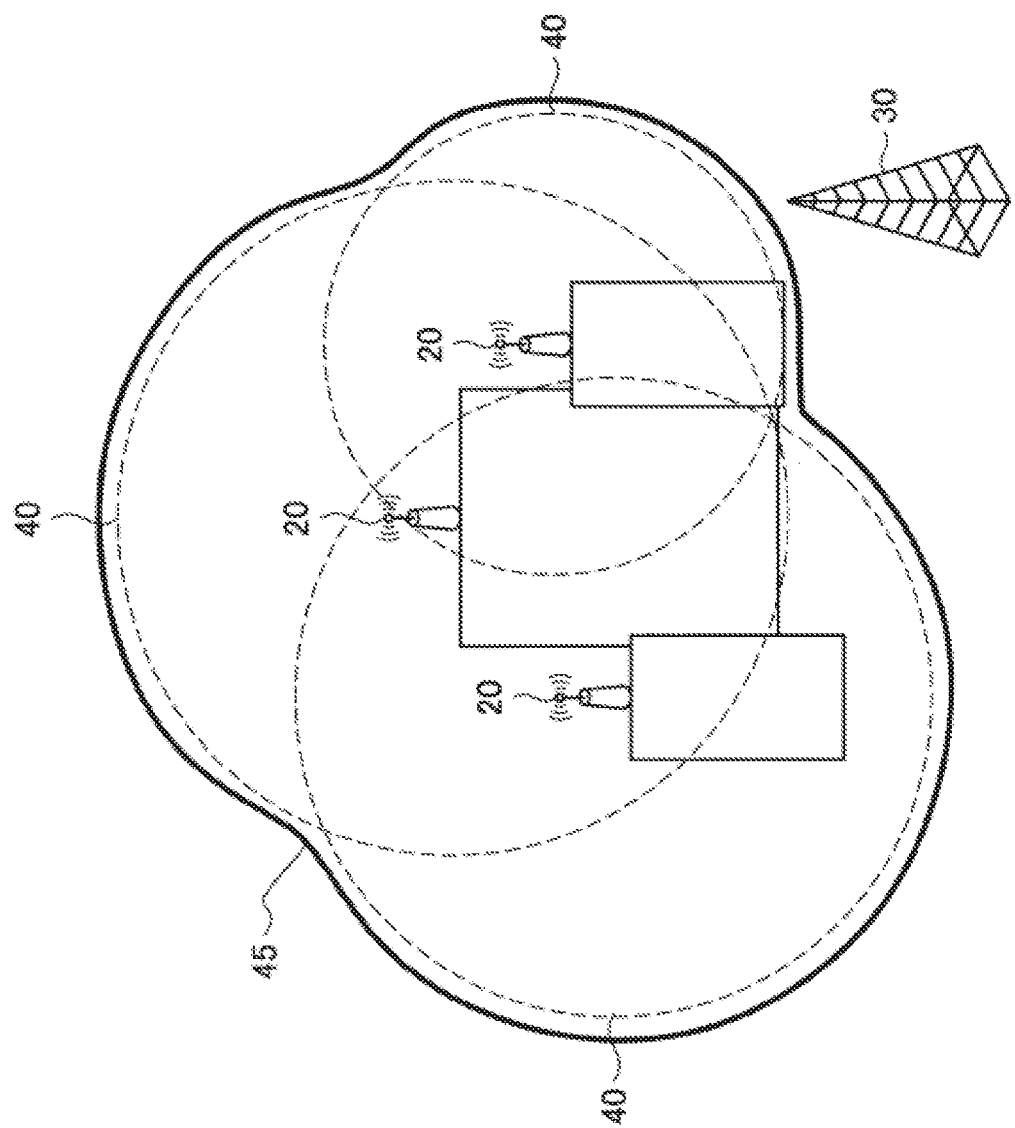
FIG. 10 is an explanatory diagram for describing a third example of a usable space.

Referring to FIG. 10, three wireless the communication devices 20 of the wireless communication system 10, and a wireless communication device 30 of another wireless communication system are illustrated. In this example, the usable spaces 40 for the respective three wireless the communication devices 20 are calculated. Then, a combined space of the three usable spaces 40 is ultimately calculated as a usable space 45 for the three wireless communication devices 20.

In the embodiment of the present disclosure, the control unit 133 may calculate a usable space 40 for each wireless communication device 20, or may calculate a usable space 45 for a plurality of the wireless communication devices 20 (i.e., the combined space of the usable spaces 40).

Fourth Example

Figure 11:
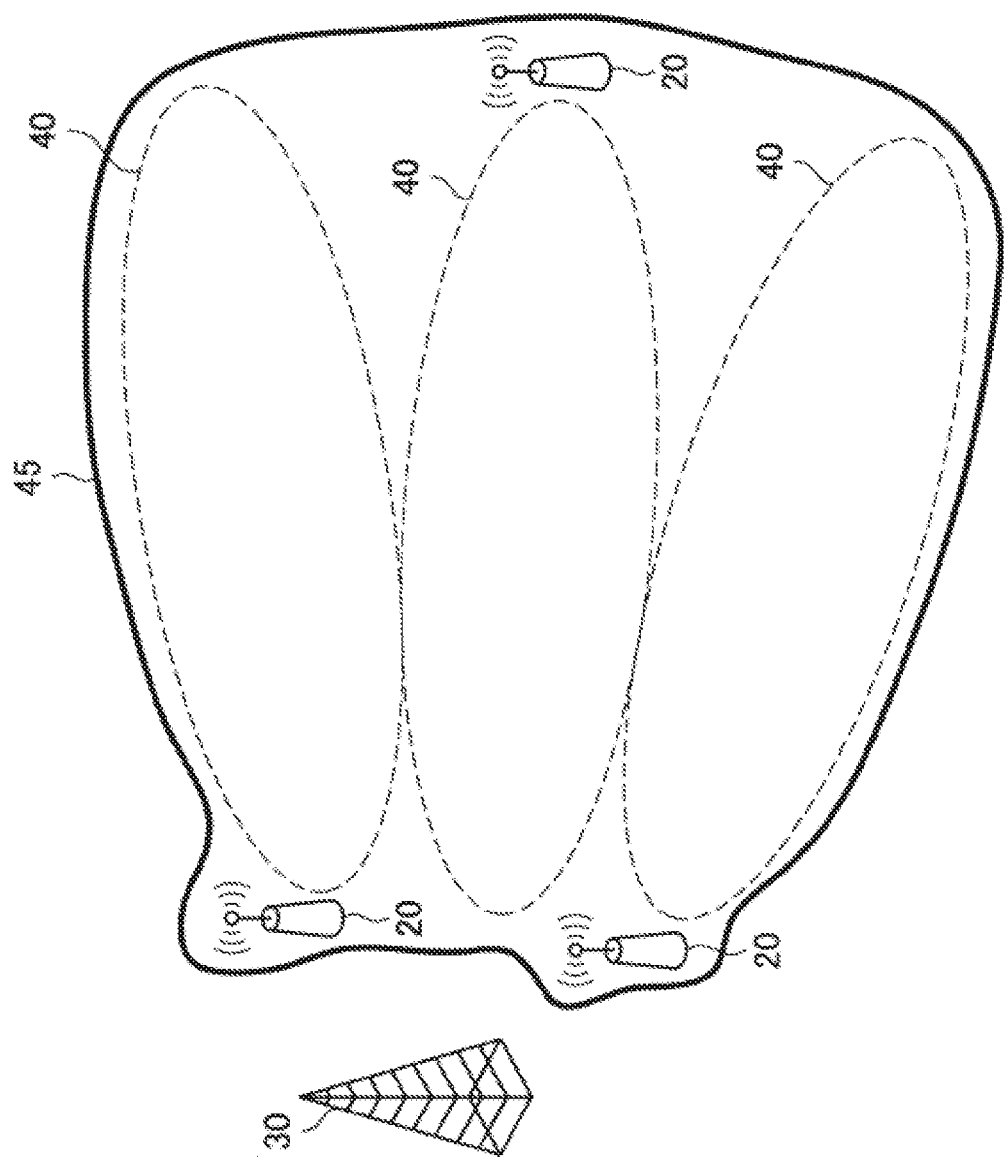
FIG. 11 is an explanatory diagram for describing a fourth example of a usable space.

Referring to FIG. 11, three wireless communication devices 20 of the wireless communication system 10, and a wireless communication device 30 of another wireless communication system are illustrated. In this example, a usable space 40 for the wireless communication device 20 is calculated, when the wireless communication device 20 performs beam forming, and the wireless communication device 20 performs beam forming. Also, a combined space of three usable spaces 40 is calculated as a usable space 45 for the three wireless communication devices 20.

Fifth Example

Figure 12:
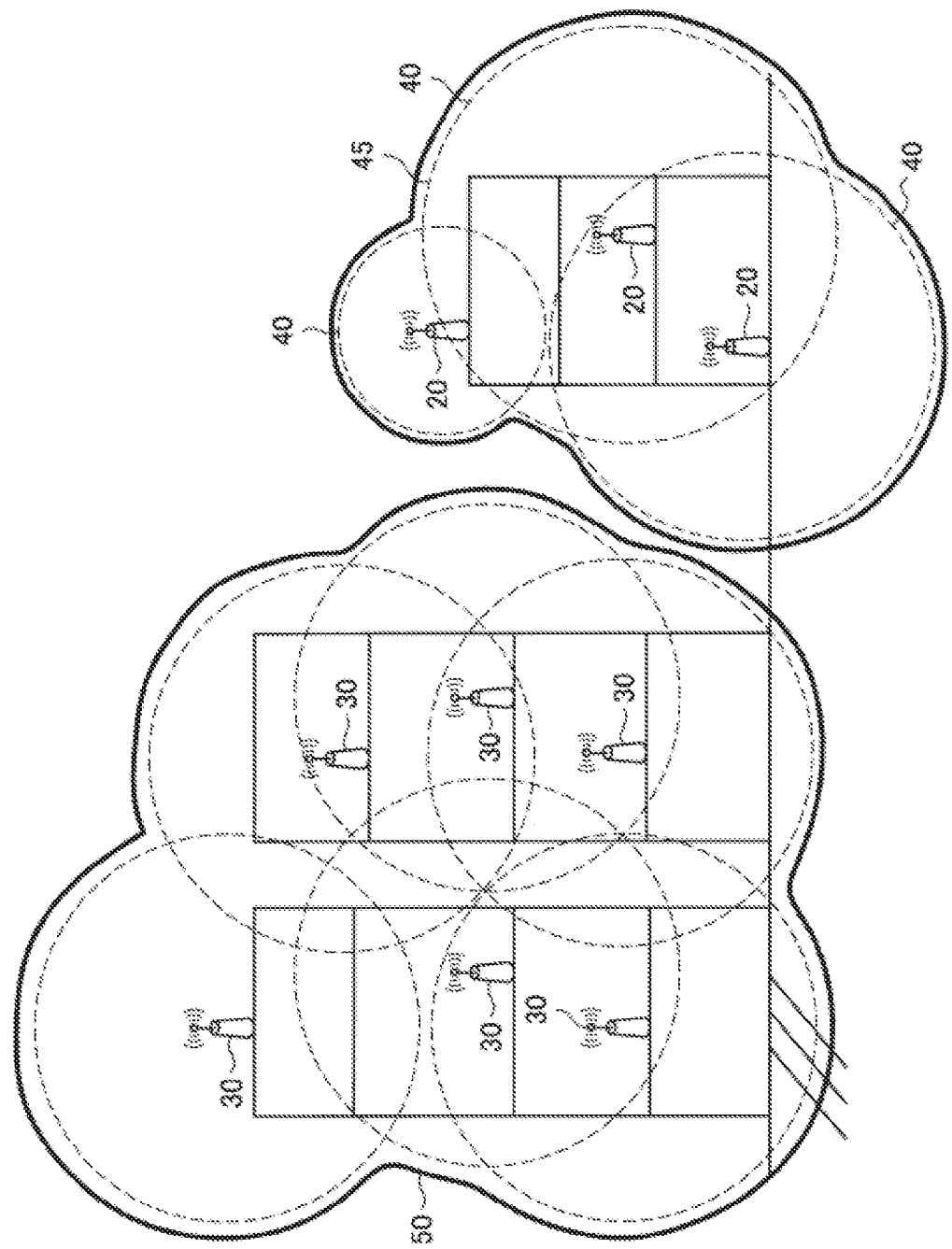
FIG. 12 is an explanatory diagram for describing a fifth example of a usable space.

Referring to FIG. 12, a plurality of wireless communication devices 20 of the wireless communication system 10, and a plurality of wireless communication devices 30 of another wireless communication system are illustrated. In this example, a space that does not overlap the space 50 where a plurality of the wireless communication devices 30 of the other wireless communication system are able to use the shared band is calculated as a usable space 45 for a plurality of the wireless communication devices 30. Note that a usable space 40 for each of a plurality of the wireless communication devices 30 may be calculated.

Sixth Example

Figure 13:
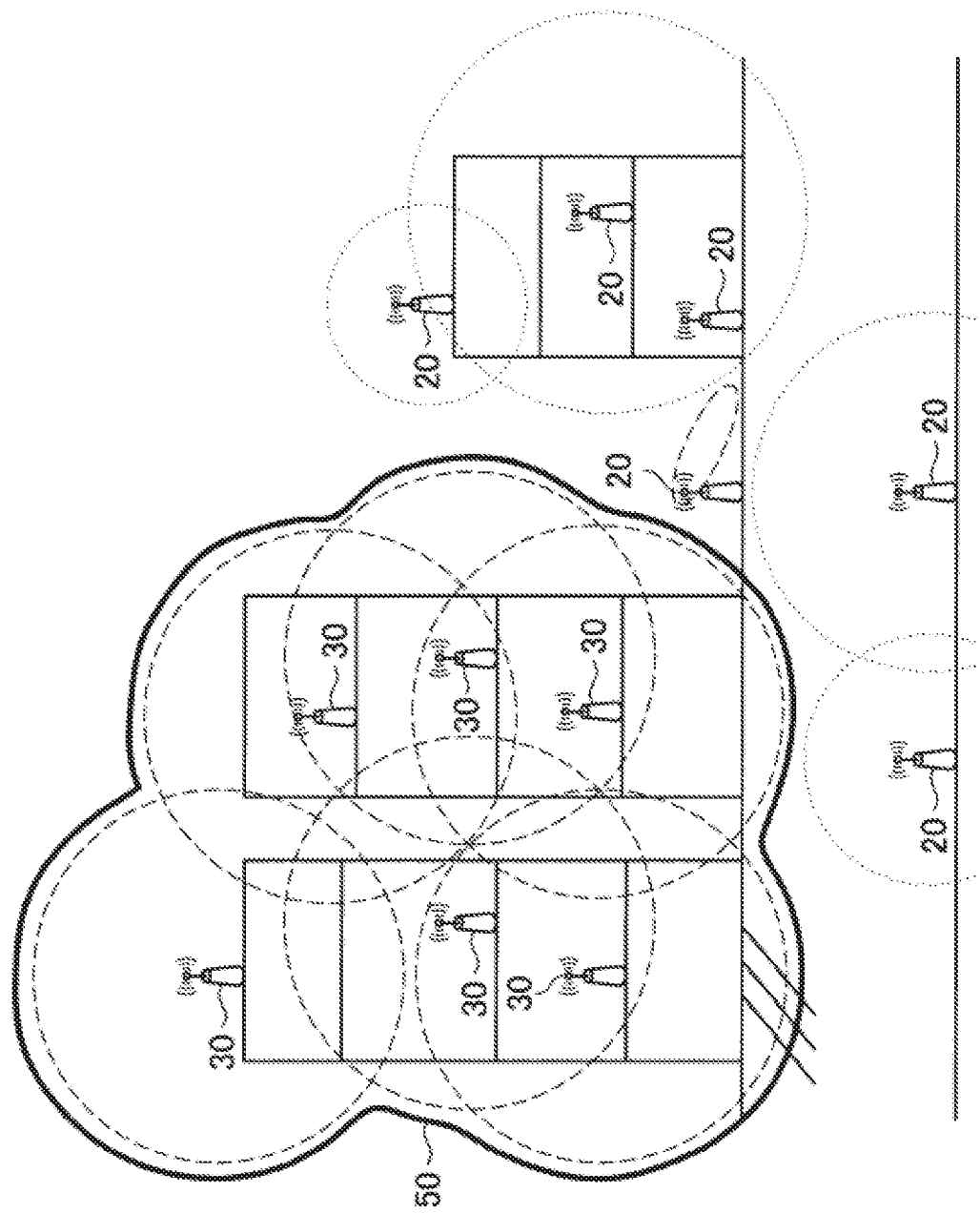
FIG. 13 is an explanatory diagram for describing a sixth example of a usable space.

Referring to FIG. 13, a plurality of wireless communication devices 20 of the wireless communication system 10, and a plurality of wireless communication devices 30 of another wireless communication system are illustrated. In this example, all space except the space 50 where a plurality of the wireless communication device 30 of the other wireless communication system are able to use the shared band is calculated as the usable space for a plurality of the wireless communication devices 30.

Seventh Example

Figure 14:
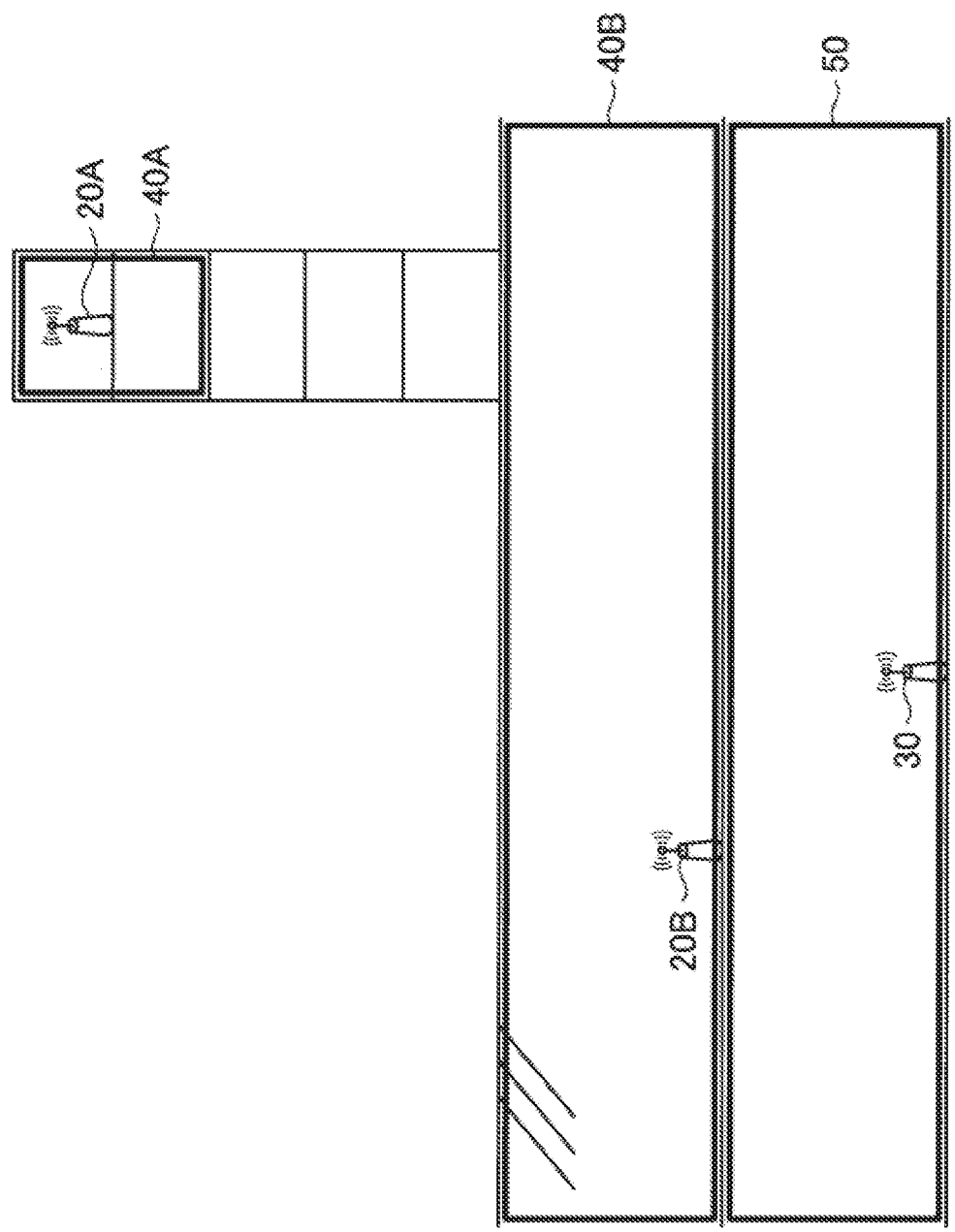
FIG. 14 is an explanatory diagram for describing a seventh example of a usable space.

Referring to FIG. 14, two wireless the communication devices 20 of the wireless communication system 10, and a wireless communication device 30 of another wireless communication system are illustrated. In this example, the space 50 where the wireless communication device 30 is able to use the shared band is the space of second basement. In this case, for example, the spaces of the third floor and the fourth floor of the building is selected as the usable space 40A for the wireless communication device 20A, and the space of the first basement is selected as the usable space 40B for the wireless communication device 20B. As described above, the space of floors can be selected, as the usable space. As one example, such a usable space can be selected, when a user of the wireless communication system 10 is a CAU, or when the wireless communication device of the wireless communication system 10 is positioned at a CAF.

Note that the wireless communication device 20 does not radiate radio wave in the shape of the-described usable space 40 (for example, the space of the third floor and the fourth floor of the building, or the space of the first basement).

Hence, the maximum transmission electric power of the wireless communication device 20 may be calculated in such a manner that the leak electric power to the outside of the usable space 40 is equal to or smaller than a predetermined electric power (or smaller than a predetermined electric power). Also, the usable space 40 including a marginal space of the outside of the floor may be calculated in consideration of the leak of the radio wave to the outside of the floor.

Although examples have been described in which the wireless communication device 20 is positioned above the ground, below the ground, and in the building with reference to FIGS. 12 to 14, the position of the wireless communication device is not limited these examples. For example, the wireless communication device 20 may be equipped in a traveling device, such as an automobile, a train, a plane, a helicopter, a ship, or a submarine. In this case as well, the usable space can be calculated in the same way.

As above, the band use condition is calculated on the basis of the position related information and the height related information (and the other-system related information). Thereby, for example, the utilization efficiency of the shared band is improved.

For example, even if the wireless communication device of the wireless communication system 10 uses the shared band with limited interference in the three-dimensional space, the wireless communication device can use the shared band. For example, even if the wireless communication device of the wireless communication system 10 is close to the wireless communication device of another wireless communication system which uses the shared band, on the flat surface, the wireless communication device can use the shared band when the wireless communication device is away from the wireless communication device of the wireless communication system, in the space. As one example, when the wireless communication device of the wireless communication system 10 is installed in one floor of the building, and the wireless communication device of the other wireless communication system is installed in another floor of the building, the wireless communication device of the wireless communication system 10 can use the shared band. In short, the utilization efficiency of the shared band can be improved.

(b) Authorization

For example, the control unit 133 authorizes the use of the shared band by the wireless communication device (of the wireless communication system 10) under the band use condition.

(b-1) Trigger of Authorization

For example, a node of the wireless communication system 10 requests authorization of the use of the shared band by the wireless communication device of the wireless communication system 10. Then, the control unit 133 calculates the condition (i.e., the band use condition) of the use of the shared band by the wireless communication device, as described above. Thereafter, for example, the information processing apparatus 100 authorizes the use of the shared band by the wireless communication device under the band use condition.

(b-2) Specific Process of Authorization

For example, the control unit 133 determines whether to authorize the use of the shared band by the wireless communication device, on the basis of the result of the calculation of the band use condition. As one example, when there is a band that the wireless communication device is able to use in the shared band, the control unit 133 determines to authorize the use of the shared band by the wireless communication device. As another example, the control unit 133 may determine to authorize the use of the shared band by the wireless communication device, when the band use condition satisfies a predetermined necessary condition (for example, when the size of the usable space is equal to or larger than a predetermined size). Then, upon determining to authorize the use of the shared band by the wireless communication device, the control unit 133 authorizes the use. That is, the control unit 133 registers the authorization of the use of the shared band by the wireless communication device, and notifies the node of the another wireless communication device of the authorization. At this, the control unit 133 provides the node with information indicating the band use condition.

For example, as above, the control unit 133 authorizes the use of the shared band by the wireless communication device (of the wireless communication system 10) under the band use condition. For example, this enables the wireless communication device of the wireless communication system 10 to use the shared band under the band use condition actually.

4. Flow of Process

Figure 15:
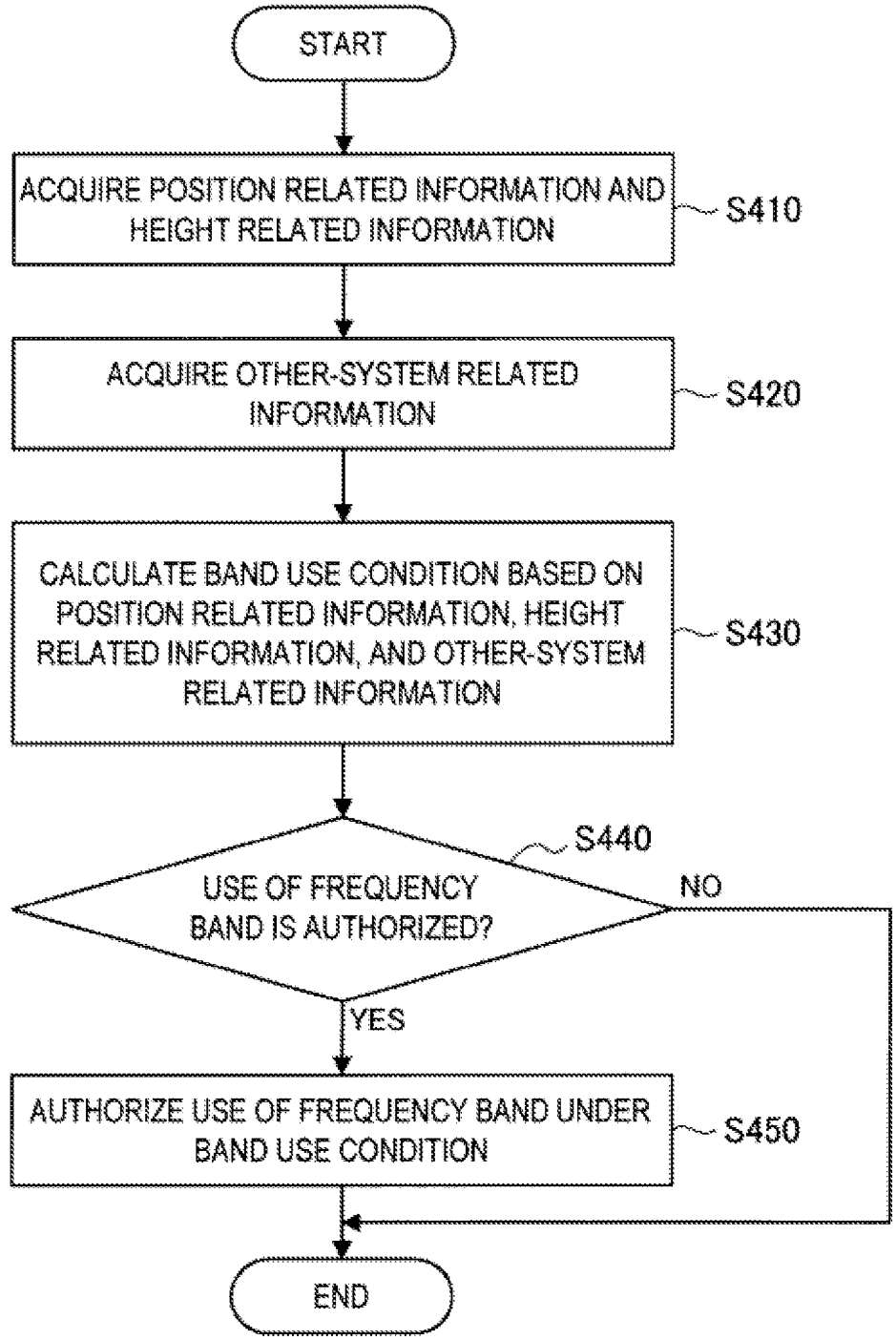
FIG. 15 is a flowchart illustrating an example of a schematic flow of a process according to the embodiment.

Next, with reference to FIG. 15, an example of the process according to the embodiment of the present disclosure will be described. FIG. 15 is a flowchart illustrating an example of the schematic flow of the process according to the embodiment of the present disclosure.

The information acquisition unit 131 acquires position related information relevant to the position of the wireless communication device of the wireless communication system 10, and height related information relevant to the height of the wireless communication device (S410).

The information acquisition unit 131 acquires information relevant to another wireless communication system (i.e., the other-system related information) that uses the frequency band sharable between a plurality of wireless communication systems including the wireless communication system 10 (i.e., the shared band) (S420).

The control unit 133 calculates a condition (i.e., band use condition) of the use by the wireless communication device of the shared band on the basis of the position related information, the height related information, and the other-system related information, (S430).

Then, the control unit 133 determines whether to authorize the use of the shared band by the wireless communication device (S440).

If it is determined to authorize the use of the shared band by the wireless communication device (S440: YES), the control unit 133 authorizes the use of the shared band by the wireless communication device (S450). Then, the process ends.

On the other hand, if it is determined to not authorize the use of the shared band by the wireless communication device (S440: NO), the process ends without authorizing the use.

5. Application Examples

The technology of the present disclosure is applicable to various products. For example, the information processing apparatus 100 may be realized as any type of server, such as a tower server, a rack server, and a blade server. At least one of components of the information processing apparatus 100 may be realized in a module (such as an integrated circuit module including a single die, and a card or a blade that is inserted into a slot of a blade server) mounted on a server. (Server)

Figure 16:
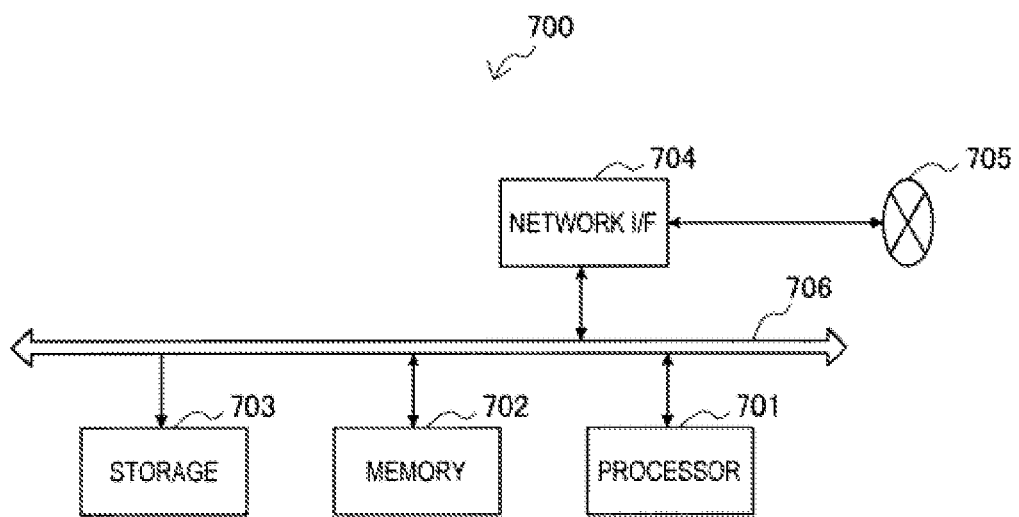
FIG. 16 is a block diagram illustrating an example of a schematic configuration of a server.

FIG. 16 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 illustrated in FIG. 16, the information acquisition unit 131 and the control unit 133, which has been described with reference to FIG. 7, may be implemented in the processor 701. As one example, a program for causing a processor to function as the information acquisition unit 131 and the control unit 133 (in other words, a program for causing a processor to execute the operation of the information acquisition unit 131 and the control unit 133) may be installed in the server 700, so that the processor 701 executes the program. As another example, it may be such that the server 700 is equipped with a module including the processor 701 and the memory 702, and the information acquisition unit 131 and the control unit 133 are implemented in the module. In this case, it may be such that the module stores a program for causing a processor to function as the information acquisition unit 131 and the control unit 133 in the memory 702, and the program is executed by the processor 701. As above, the server 700 or the module may be provided as a device including the information acquisition unit 131 and the control unit 133, and the program for causing a processor to function as the information acquisition unit 131 and the control unit 133 may be provided. Also, a computer-readable recording medium in which the program is recorded may be provided.

6. Conclusion

In the, with reference to FIGS. 1 to 16, the device and process according to embodiments of the present disclosure have been described. According to an embodiment of the present disclosure, the information processing apparatus 100 includes the information acquisition unit 131 that acquires the position related information relevant to the position of the wireless communication device of the wireless communication system 10, and the height related information relevant to the height of the wireless communication device, and the control unit 133 that calculates a condition of use, by the wireless communication device, of the frequency band sharable between a plurality of the wireless communication systems including the wireless communication system 10, on the basis of the position related information and the height related information.

Thereby, for example, the utilization efficiency of the frequency band (i.e., the shared band) that is sharable between a plurality of wireless communication systems is improved. More specifically, for example, even if the wireless communication device of the wireless communication system 10 uses the shared band with limited interference in the three-dimensional space, the wireless communication device can use the shared band. For example, even if the wireless communication device of the wireless communication system 10 is close to the wireless communication device of another wireless communication system which uses the shared band, on the flat surface, the wireless communication device can use the shared band when the wireless communication device is away from the wireless communication device of the wireless communication system, in the space. As one example, when the wireless communication device of the wireless communication system 10 is installed in one floor of the building, and the wireless communication device of the other wireless communication system is installed in another floor of the building, the wireless communication device of the wireless communication system 10 can use the shared band. In short, the utilization efficiency of the shared band can be improved.

It should be understood by those skilled in the art that various modifications, combinations, sub-combinations and alterations may occur depending on design requirements and other factors insofar as they are within the scope of the appended claims or the equivalents thereof.

For example, although the information processing apparatus independently authorizes the use of the shared band in the example described above, the present disclosure is not limited to such an example. For example, authorization of the use of the shared band may be reconciled between the information processing apparatus and another device that authorizes the use of the shared band. In this case as well, the information processing apparatus can execute calculation of the band use condition, and authorization of the use of the shared band, by the same method as the method described above.

Also, for example, although the shared band is the target frequency band of the frequency sharing scheme studied in the FCC in the specific example described above, the present disclosure is not limited to such an example, as a matter of course. The shared band may be another frequency band. As one example, the shared band may be a frequency band for television broadcast (i.e., TVWS). As another example, the shared band may be a target frequency band of licensed shared access (LSA). Note that the shared band is not limited to these examples, but may be an arbitrary frequency band sharable between a plurality of wireless communication systems.

Also, for example, the information processing apparatus executes calculation of the band use condition and authorization of the use of the shared band in the example described above, but the present disclosure is not limited to such an example. For example, it may be such that the information processing apparatus calculates the band use condition, and another device authorizes the use of the shared band.

In addition, process steps in each process of the specification may not necessarily be executed in a time series manner in the order described in the flowcharts. For example, the process steps in the processes may be executed in an order different from the orders described in the flowcharts or sequence diagrams, or may be executed in a parallel manner.

Also, a computer program for causing a processor (for example, CPU, DSP, etc) equipped in the device according to embodiments of the present specification (for example, information processing apparatus, or modules of the information processing apparatus) to function as components of the device (for example, the information acquisition unit and the control unit) (in other words, a computer program for causing the processor to execute the operation of the components of the device) can be fabricated. Also, a recording medium in which the computer program is recorded may be provided. Also, a device including a memory for storing the computer program and one or more processors capable of executing the computer program (for example, a completed product, or modules for the completed product (component, processing circuit, chip, etc)) may be provided. Also, a method including the operation of components of the device (for example, the information acquisition unit and the control unit) is also included in the technology according to the embodiments of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

(1)

A system including: circuitry configured to acquire at least position information, height information and first priority information corresponding to a first wireless communication system, and second priority information corresponding to a second wireless communication system; determine a use condition for a shared frequency band shared between the first and second wireless communication systems based on the position information, the height information, the first priority information and the second priority information; and output a notification based on the determined use condition.

(2)

The system of (1), wherein the position information is at least one of information indicating an area that the first wireless communication system is positioned or information indicating an area that each of a plurality of devices in the first wireless communication system are positioned.

(3)

The system of any of (1) to (2), wherein the height information indicates a height of an antenna of a device of the first wireless communication system.

(4)

The system of any of (1) to (3), wherein the height information indicates at least one of an elevation of the first wireless communication system, an altitude of the first wireless communication system, a ground height of the first wireless communication system, a height above sea level of the first wireless communication system, or a depth of a position measuring system of the first wireless communication system.

(5)

The system of any of (1) to (4), wherein the height information indicates at least one of a floor of a building on which the first wireless communication system is located, an air pressure of an environment in which the first wireless communication system is located, or a water pressure of an environment in which the first wireless communication system is located.

(6)

The system of any of (1) to (5), wherein the first priority information includes information indicating a priority of the first wireless communication system with respect to use of the shared frequency band.

(7)

The system of (6), wherein the priority of the first wireless communication system is one of at least three levels of priority available for assignment for use of the shared frequency band.

(8)

The system of any of (1) to (7), wherein the first priority information includes information indicating a user type corresponding to the first wireless communication system.

(9)

The system of (8), wherein the user type corresponds to at least one of a business operator, an individual, or a public organization.

(10)

The system of any of (1) to (9), wherein the first priority information indicates that the first wireless communication system is a system of a contained access user (CAU).

(11)

The system of any of (1) to (10), wherein the first priority information indicates that the first wireless communication system is a system of a contained access facility (CAF).

(12)

The system of any of (1) to (11), wherein the circuitry is configured to acquire information corresponding to the shared frequency band.

(13)

The system of any of (1) to (12), wherein the circuitry is configured to acquire at least one of information indicating a bandwidth of the shared frequency band or information indicating a center of the shared frequency band.

(14)

The system of (13), wherein the circuitry is configured to determine the use condition for the shared frequency band based on the position information, the height information, the first priority information, the second priority information and the at least one of information indicating the bandwidth of the shared frequency band or information indicating the center of the shared frequency band.

(15)

The system of any of (1) to (14), wherein the circuitry is configured to acquire information indicating use of the shared frequency band by the second wireless communication system.

(16)

The system of (15), wherein the circuitry is configured to determine the use condition for the shared frequency band based on the position information, the height information, the first priority information, the second priority information and the information indicating the use of the shared frequency band by the second wireless communication system.

(17)

The system of (16), wherein the information indicating the use of the shared frequency band by the second wireless communication system indicates an antenna directivity condition of the second wireless communication system with respect to the shared frequency band, and the circuitry is configured to determine the use condition for the shared frequency band based on the position information, the height information, the first priority information, the second priority information and the antenna directivity condition of the second wireless communication system with respect to the shared frequency band.

(18)

The system of any of (1) to (17), wherein the circuitry is configured to acquire information indicating an exclusion zone with respect to the shared frequency band, and determine the use condition for the shared frequency band based on the position information, the height information, the first priority information, the second priority information and the information indicating the exclusion zone.

(19)

The system of any of (1) to (18), wherein the determined use condition corresponds to a bandwidth within the shared frequency band that is usable by the first wireless communication system.

(20)

The system of any of (1) to (19), wherein the determined use condition corresponds to a usable space in which transmission within the shared frequency band is permitted to exceed a predetermined threshold.

(21)

The system of any of (1) to (20), wherein the determined use condition indicates a maximum transmission of power within the shared frequency band.

(22)

The system of any of (1) to (21), wherein the determined use condition corresponds to an antenna directivity that the first communication system is permitted to use when accessing the shared frequency band.

(23)

The system of any of (1) to (22), wherein the first wireless communication system is a single communication device.

(24)

The system of any of (1) to (23), wherein the system is one of a terminal device that operates as a base station, a terminal that operates as an access point, a device that performs device-to-device communication, or a moving relay base station.

(25)

A method including: acquiring at least position information, height information and first priority information corresponding to a first wireless communication system, and second priority information corresponding to a second wireless communication system; determining a use condition for a shared frequency band shared between the first and second wireless communication systems based on the position information, the height information, the first priority information and the second priority information; and outputting a notification based on the determined use condition.

(26)

A non-transitory computer-readable medium including computer program instructions, which when executed by an information processing system, cause the system to: acquire at least position information, height information and first priority information corresponding to a first wireless communication system, and second priority information corresponding to a second wireless communication system; determine a use condition for a shared frequency band shared between the first and second wireless communication systems based on the position information, the height information, the first priority information and the second priority information; and output a notification based on the determined use condition.

(27)

A terminal device including: circuitry configured to provide at least position information, height information and first priority information corresponding to the terminal device; receive information indicating a use condition for a shared frequency band shared between the terminal device and a second wireless communication system based on the position information, the height information, the first priority information and second priority information corresponding to the second wireless system; and access the shared frequency band according to the received information indicating the use condition.

(28)

A method performed by a terminal device, the method including: providing at least position information, height information and first priority information corresponding to the terminal device; receiving information indicating a use condition for a shared frequency band shared between the terminal device and a second wireless communication system based on the position information, the height information, the first priority information and second priority information corresponding to the second wireless system; and accessing the shared frequency band according to the received information indicating the use condition.

(29)

A non-transitory computer-readable medium including computer program instructions, which when executed by a terminal device, cause the system to: provide at least position information, height information and first priority information corresponding to the terminal device; receive information indicating a use condition for a shared frequency band shared between the terminal device and a second wireless communication system based on the position information, the height information, the first priority information and second priority information corresponding to the second wireless system; and access the shared frequency band according to the received information indicating the use condition. Additionally, the present technology may also be configured as below.

(1) An apparatus including:

an acquisition unit configured to acquire position related information relevant to a position of a wireless communication device of a wireless communication system, and height related information relevant to a height of the wireless communication device; and a control unit configured to calculate a condition of use, by the wireless communication device, of a frequency band sharable between a plurality of wireless communication systems including the wireless communication system, on the basis of the position related information and the height related information.

(2) The apparatus according to (1), wherein the wireless communication systems include another wireless communication system having a different priority from the wireless communication system, with respect to the use of the frequency band.

(3) The apparatus according to (1) or (2), wherein the wireless communication systems include a wireless communication system having a first priority with respect to the use of the frequency band, a wireless communication system having a second priority that is lower than the first priority with respect to the use of the frequency band, and a wireless communication system having a third priority that is lower than the second priority with respect to the use of the frequency band, and the wireless communication system is the wireless communication system having the second priority or the wireless communication system having the third priority.

(4) The apparatus according to any one of (1) to (3), wherein the condition includes a space in which the wireless communication device is able to use the frequency band, or a maximum transmission electric power of the wireless communication device with respect to the frequency band.

(5) The apparatus according to any one of (1) to (4), wherein the condition includes a band within the frequency band, which the wireless communication device is able to use.

(6) The apparatus according to any one of (1) to (5), wherein the condition includes a condition of beam forming by the wireless communication device with respect to the frequency band.

(7) The apparatus according to any one of (1) to (6), wherein the control unit calculates the condition that circumvents or reduces interference with another wireless communication system having a priority that is higher than a priority of the wireless communication system with respect to the use of the frequency band.

(8) The apparatus according to (7), wherein the control unit calculates the condition that also circumvents or reduces interference with another wireless communication system having a priority that is same as the priority of the wireless communication system with respect to the use of the frequency band.

(9) The apparatus according to (7) or (8), wherein the condition is a condition that reduces a level of the interference to an acceptable level of the other wireless communication system or below, or a condition that does not lower quality of service (QoS) of the other wireless communication system below a request level.

(10) The apparatus according to (7) or (8), wherein the condition includes a space in which the wireless communication device is able to use the frequency band, and the space does not overlap a space in which a wireless communication device of the other wireless communication system is able to use the frequency band.

(11) The apparatus according to any one of (1) to (10), wherein the acquisition unit acquires information relevant to another wireless communication system that uses the frequency band, and the control unit calculates the condition, on the basis of the position related information, the height related information, and the information relevant to the other wireless communication system.

(12) The apparatus according to (11), wherein the other wireless communication system is a wireless communication system having a priority that is higher than a priority of the wireless communication system with respect to the use of the frequency band, or the other wireless communication system is a wireless communication system having a priority that is equal to or higher than the priority of the wireless communication system with respect to the use of the frequency band.

(13) The apparatus according to (11) or (12), wherein the information relevant to the other wireless communication system includes position related information relevant to a position of a wireless communication device of the other wireless communication system, and height related information relevant to a height of the wireless communication device of the other wireless communication system.

(14) The apparatus according to any one of (11) to (13), wherein the information relevant to the other wireless communication system includes information relevant to the use of the frequency band by a wireless communication device of the other wireless communication system.

(15) The apparatus according to (14), wherein the information relevant to the use of the frequency band includes information indicating a band within the frequency band which the wireless communication device of the other wireless communication system is able to use, information indicating a maximum transmission electric power of the wireless communication device of the other wireless communication system with respect to the frequency band, information indicating a condition of beam forming by the wireless communication device of the other wireless communication system with respect to the frequency band, information indicating an acceptable level of the wireless communication device of the other wireless communication system with respect to interference, information indicating a request level of QoS of the other wireless communication system, information indicating a space in which the wireless communication device of the other wireless communication system is able to use the frequency band, or information indicating an exclusion space of the other wireless communication system with respect to the frequency band.

(16) The apparatus according to any one of (7) to (15), wherein the other wireless communication system includes a wireless communication system that is authorized to use the frequency band by another device that is different from a device that authorizes the use of the frequency band by the wireless communication device.

(17) The apparatus according to any one of (1) to (17), wherein the control unit authorizes the use of the frequency band by the wireless communication device under the condition.

(18) The apparatus according to any one of (1) to (17), wherein the height related information is information relevant to a height of an antenna of the wireless communication device.

(19) The apparatus according to any one of (1) to (18), wherein the height related information is information indicating an elevation, an altitude, a ground height, a height above sea level, or a depth of a position measuring system, a floor of a building, an air pressure, or a water pressure.

(20) A method including:
acquiring position related information relevant to a position of a wireless communication device of a wireless communication system, and height related information relevant to a height of the wireless communication device; and
calculating, by a processor, a condition of use, by the wireless communication device, of a frequency band sharable between a plurality of wireless communication systems including the wireless communication system, on the basis of the position related information and the height related information.

(21) A program causing a processor to execute:
acquiring position related information relevant to a position of a wireless communication device of a wireless communication system, and height related information relevant to a height of the wireless communication device; and
calculating a condition of use, by the wireless communication device, of a frequency band sharable between a plurality of wireless communication systems including the wireless communication system, on the basis of the position related information and the height related information.

(22) A non-transitory computer-readable recording medium having a program stored thereon, the program causing a processor to execute:
acquiring position related information relevant to a position of a wireless communication device of a wireless communication system, and height related information relevant to a height of the wireless communication device; and
calculating a condition of use, by the wireless communication device, of a frequency band sharable between a plurality of wireless communication systems including the wireless communication system, on the basis of the position related information and the height related information.

REFERENCE SIGNS LIST 1 system
10 wireless communication system
20, 30 wireless communication device
40, 50 usable space
100 information processing apparatus
131 information acquisition unit
133 control unit
700 server

The invention claimed is:
1. An apparatus, comprising:
  circuitry configured to
    acquire position information indicating a position of a wireless communication device of a wireless communication system, height information indicating a height of the wireless communication device, first priority information corresponding to the wireless communication system and second priority information corresponding to another wireless communication system;
    determine a use condition including space information of the wireless communication device regarding a frequency band sharable among a plurality of wireless communication systems including the wireless communication system and the another communication system, based on the position information, the height information, the first priority information and the second priority information; and
    output information indicating the determined use condition, wherein the circuitry is configured to determine the use condition that circumvents or reduces interference with the another wireless communication system having a priority that is higher than a priority of the wireless communication system with respect to a use of the frequency band sharable among the plurality of wireless communication systems,
  the space information is regarding a space in three-dimensions in which the wireless communication device can use the frequency band, the space information defining a three-dimensional space, and
  the circuitry is configured to determine the space information, based on the position information, the height information, the first priority information and the second priority information, such that the space does not overlap a space in three-dimensions in which a wireless communication device of the another wireless communication system is able to use the frequency band sharable among the plurality of wireless communication systems, the first priority information and the second priority information being priority information with respect to the use of the frequency band sharable among the plurality of wireless communication systems.
2. The apparatus according to claim 1, wherein
  the use condition includes at least one of space information regarding a space in which the wireless communication device can use the frequency band, and maximum transmission electric power information regarding maximum transmission electric power of the wireless communication device with respect to the frequency band.

3. The apparatus according to claim 1, wherein
  the use condition includes band information regarding a band within the frequency band, which the wireless communication device can use.
4. The apparatus according to claim 1, wherein
  the circuitry is configured to determine the use condition that also circumvents or reduces interference with a second wireless communication system having a priority that is same as the priority of the wireless communication system with respect to the use of the frequency band.
5. The apparatus according to claim 1, wherein
  the circuitry is configured to
    acquire information regarding the another wireless communication system that uses the frequency band; and
    determine the use condition based on the position information, the height information, and the information regarding the another wireless communication system.
6. The apparatus according to claim 5, wherein
  the information regarding the another wireless communication system includes position information regarding a position of a wireless communication device of the another wireless communication system, and height information regarding a height of the wireless communication device of the another wireless communication system.
7. The apparatus according to claim 5, wherein
  the information regarding the another wireless communication system includes information regarding a use of the frequency band by a wireless communication device of the another wireless communication system.
8. The apparatus according to claim 1, wherein
  the circuitry is configured to authorize a use of the frequency band by the wireless communication device under the use condition.
9. The apparatus according to claim 1, wherein
  the height information is information regarding a height of an antenna of the wireless communication device.
10. The apparatus according to claim 1, wherein
  the height information is information indicating at least one of: an elevation of the wireless communication system, an altitude of the wireless communication system, a ground height of the wireless communication system, a height above sea level of the wireless communication system, a depth of a position measuring system of the wireless communication system, a floor of a building on which the wireless communication system is located, an air pressure of an environment in which the wireless communication system is located, and a water pressure of an environment in which the wireless communication system is located.
11. A terminal device, comprising:
  circuitry configured to
    provide position information regarding a position of the terminal device of a wireless communication system, height information regarding a height of the terminal device, and first priority information corresponding to the wireless communication system;
    receive, from an apparatus, information indicating a use condition including space information for a shared frequency band shared between the terminal device and another wireless communication system having a priority that is higher than a priority of the wireless communication system with respect to a use of the shared frequency band, the use condition circumventing or reducing interference with the another wireless communication system; and access the shared frequency band according to the received information indicating the use condition, wherein the space information is regarding a space in three-dimensions in which the terminal device can use the frequency band, the space information defining a three-dimensional space, and the space information is determined by the apparatus based on the position information, the height information, the first priority information and second priority information corresponding to the another wireless communication system such that the space does not overlap a space in three-dimensions in which a terminal device of the another wireless communication system is able to use the frequency band sharable among the plurality of wireless communication systems, the first priority information and the second priority information being priority information with respect to the use of the frequency band sharable among the plurality of wireless communication systems.

12. The terminal device according to claim 11, wherein the use condition includes at least one of space information regarding a space in which the terminal device can use the frequency band, and maximum transmission electric power information regarding maximum transmission electric power of the terminal device with respect to the frequency band.

13. The terminal device according to claim 11, wherein the use condition includes band information regarding a band within the frequency band, which the terminal device can use.

14. The terminal device according to claim 11, wherein the height information is information regarding a height of an antenna of the terminal device.

15. The terminal device according to claim 11, wherein the height information is information indicating at least one of: an elevation of the wireless communication system, an altitude of the wireless communication system, a ground height of the wireless communication system, a height above sea level of the wireless communication system, a depth of a position measuring system of the wireless communication system, a floor of a building on which the wireless communication system is located, an air pressure of an environment in which the wireless communication system is located, and a water pressure of an environment in which the wireless communication system is located.

* * * * *